(12) United States Patent
Namba

(10) Patent No.: US 9,321,921 B2
(45) Date of Patent: Apr. 26, 2016

(54) POST-TREATMENT LIQUID FOR INKJET RECORDING, IMAGE FORMING METHOD, CARTRIDGE AND IMAGE FORMING APPARATUS

(71) Applicant: Michihiko Namba, Kanagawa (JP)

(72) Inventor: Michihiko Namba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 13/743,688

(22) Filed: Jan. 17, 2013

(65) Prior Publication Data
US 2013/0201252 A1 Aug. 8, 2013

(30) Foreign Application Priority Data
Feb. 2, 2012 (JP) .................. 2012-020660

(51) Int. Cl.
*C09D 5/00* (2006.01)
*B41J 11/00* (2006.01)
*B41M 7/00* (2006.01)
*C09D 11/54* (2014.01)
(Continued)

(52) U.S. Cl.
CPC .............. *C09D 5/00* (2013.01); *B41J 11/0015* (2013.01); *B41M 7/0036* (2013.01); *C09D 11/322* (2013.01); *C09D 11/40* (2013.01); *C09D 11/54* (2013.01); *B41M 5/0017* (2013.01)

(58) Field of Classification Search
CPC .......... B41J 2/01; B41J 2/2107; B41J 2/2114; B41J 2/17503; B41J 11/0015; B41J 11/002; B41J 2/0057; B41J 2/1433; B41J 2/17; B41J 2/1755; B41J 2/17593; B41J 2/21; B41J 2/211; B41J 2/2117; B41J 2/2056; B41J 3/60; C09D 11/00; C09D 11/005; C09D 11/30; C09D 11/40; C09D 11/54; C09D 11/101; C09D 11/32; C09D 11/322; C09D 11/328; C09D 11/36; C09D 11/38; C09D 11/52; B41M 5/0011; B41M 5/0017; B41M 5/52; B41M 5/5218; B41M 7/00; B41M 7/0072; B41M 7/0081; B41M 7/009; B41M 5/00
USPC ........... 347/86, 95–105, 9–22, 88; 106/31.13, 106/31.27, 31.6, 31.85, 31.77; 523/160, 523/161
See application file for complete search history.

(56) References Cited

U.S. PATENT DOCUMENTS 7,094,813 B2   8/2006   Namba et al.
7,284,851 B2   10/2007  Bannai et al.
(Continued)

FOREIGN PATENT DOCUMENTS

CN   1933978 A     3/2007
CN   101910329 A   12/2010
(Continued)

OTHER PUBLICATIONS

Extended Search Report issued Jun. 3, 2013 in European Patent Application No. 13152785.5.
(Continued)

*Primary Examiner* — Matthew Luu
*Assistant Examiner* — Rut Patel
(74) *Attorney, Agent, or Firm* — Oblon, McClelland, Maier & Neustadt, L.L.P

(57) ABSTRACT

A post-treatment liquid for inkjet recording including a urethane resin, a fluorosurfactant, a water-soluble organic solvent and water.

3 Claims, 9 Drawing Sheets

(51) Int. Cl.
*C09D 11/322* (2014.01)
*C09D 11/40* (2014.01)
*B41M 5/00* (2006.01)

(56) References Cited

U.S. PATENT DOCUMENTS

| | | |
|---|---|---|
| 7,682,011 B2 | 3/2010 | Namba et al. |
| 7,699,457 B2 | 4/2010 | Namba et al. |
| 7,810,919 B2 | 10/2010 | Kojima et al. |
| 7,892,340 B2 | 2/2011 | Namba et al. |
| 8,044,114 B2 | 10/2011 | Habashi et al. |
| 8,096,651 B2 | 1/2012 | Ohshima et al. |
| 8,173,227 B2 | 5/2012 | Morohoshi et al. |
| 8,240,836 B2 | 8/2012 | Morohoshi et al. |
| 8,252,207 B2 | 8/2012 | Namba et al. |
| 8,304,043 B2 | 11/2012 | Nagashima et al. |
| 2006/0000386 A1 | 1/2006 | Hakamada et al. |
| 2008/0225100 A1 | 9/2008 | Kumagai |
| 2008/0257203 A1 | 10/2008 | Choy et al. |
| 2009/0186162 A1* | 7/2009 | Namba et al. ............ 427/511 |
| 2009/0263632 A1 | 10/2009 | Kojima et al. |
| 2010/0271435 A1 | 10/2010 | Kojima et al. |
| 2010/0279035 A1 | 11/2010 | Namba et al. |
| 2010/0309260 A1* | 12/2010 | Hakiri et al. ......... C09D 11/324 347/56 |
| 2011/0092610 A1 | 4/2011 | Habashi et al. |
| 2011/0211014 A1 | 9/2011 | Irita |
| 2011/0216123 A1 | 9/2011 | Tamai et al. |
| 2011/0300353 A1 | 12/2011 | Habashi et al. |
| 2011/0303113 A1 | 12/2011 | Sarkisian et al. |
| 2011/0310166 A1 | 12/2011 | Namba et al. |
| 2012/0092411 A1* | 4/2012 | Hakiri et al. ............ B41J 2/2107 347/20 |
| 2012/0128949 A1 | 5/2012 | Goto |
| 2012/0236066 A1 | 9/2012 | Tamai et al. |
| 2012/0320133 A1 | 12/2012 | Namba et al. |

FOREIGN PATENT DOCUMENTS

| | | |
|---|---|---|
| JP | 2004-330553 | 11/2004 |
| JP | 2004-330568 | 11/2004 |
| JP | 2006-035796 | 2/2006 |
| JP | 2006-169325 A | 6/2006 |
| JP | 2008-221650 | 9/2008 |
| JP | 2010-105187 | 5/2010 |
| JP | 2010-115854 | 5/2010 |
| JP | 4513267 | 5/2010 |
| WO | WO 2005/087501 A1 | 9/2005 |
| WO | WO 2011/021591 A1 | 2/2011 |

OTHER PUBLICATIONS

Combined Office Action and Search Report issued Jan. 23, 2014 in Chinese Patent Application No. 201310042770.8 with English language translation.

Combined Chinese Office Action and Search Report issued Aug. 1, 2014, in Chinese Patent Application No. 201310042770.8 with English translation.

* cited by examiner

POST-TREATMENT LIQUID FOR INKJET RECORDING, IMAGE FORMING METHOD, CARTRIDGE AND IMAGE FORMING APPARATUS

BACKGROUND OF THE INVENTION

1. Field of the Invention

The present invention relates to a post-treatment liquid for inkjet recording, an image forming method, a cartridge and an image forming apparatus.

2. Description of the Related Art

An inkjet recording method has been rapidly spreading in recent years since it enables recording a color image on plain paper and at low running costs. However, this method has problems that image defects typified by letter bleeding (feathering) are likely to occur depending on combinations of an ink and a recording medium and also that image quality largely degrades such as degradation of beading quality on offset printing paper combined with a water-based ink since it has extremely poor absorbency of the water-based ink.

Also, when a color image is recorded by the inkjet recording method, color inks having different colors are superimposed one after another. This causes the color inks to smear or mix at a color boundary part (hereinafter referred to as color bleed), which is a problem of largely decreased image quality.

Thus, in order to increase image quality by solving these problems, image forming methods using a treatment liquid and an ink is proposed. For example, a method of discharging a treatment liquid from a head for uniform application of the treatment liquid, a method of pneumatically spraying, and a method of coating uniformly by controlling pressures of a coating roller and an opposing roller have been considered.

Further, regarding a treatment liquid used in a post-process after printing with an ink, a method including processes of a pre-treatment process, a printing process and a post-treatment process, wherein a UV varnish is sprayed particularly in the post-treatment process (for example, see Japanese Patent Application Laid-Open (JP-A) No. 2004-330568), and a method of imparting image scratch resistance by coating an image-forming section with an overcoat liquid including a resin after printing have been considered (for example, see JP-A No. 2010-105187 and JP-A No. 2010-115854).

The method described in JP-A No. 2004-330568 above has problems of increased size of an apparatus, increased costs, and safety of materials. Also, the methods described in JP-A No. 2010-105187 and JP-A No. 2010-115854 have problems in ensuring discharge stability of the overcoat liquid including a resin from the head and increased costs of materials such as resin, and especially, scratch resistance of printed matters of offset printing paper using a water-based ink is not sufficient.

An oil-based ink is generally used on offset printing paper, but its use is restricted in view of resource conservation in recent years as well as safety. Also, in view of energy conservation, printing has been more favored with a water-based ink, and especially in printing of lots with small number of pages, there is observed a tendency that the market is shifting to on-demand printing using an inkjet process. Generic offset printing paper is made for a specification of an oil-based ink, and its absorbency of a water-based ink is extremely poor. Thus, the ink does not uniformly wet and spread and bleeds severely, and there are big problems of especially degradation of beading quality and image drying properties and fixability right after printing in fast one-pass printing.

Accordingly, in inkjet recording on a recording medium, further in recording on offset printing paper using a water-based ink, a post-treatment liquid for inkjet recording which enables an image having superior beading quality and scratch resistance even in fast one-pass printing has been currently sought.

SUMMARY OF THE INVENTION

The present invention aims at solving the above problems in the conventional technologies and at achieving the following objection. That is, the present invention aims at providing a post-treatment liquid for inkjet recording which enables an image having superior beading quality and scratch resistance even in fast one-pass printing in inkjet recording on a recording medium and further in recording on offset printing paper using a water-based ink.

Means for solving the problems are as follows. That is,

A post-treatment liquid for inkjet recording of the present invention is a post-treatment liquid for inkjet recording including a urethane resin, a fluorosurfactant, a water-soluble organic solvent and water.

The present invention may solve the conventional problems and provide a post-treatment liquid for inkjet recording which enables an image having superior beading quality and scratch resistance even in fast one-pass printing in inkjet recording on a recording medium, and further in recording on offset printing paper using a water-based ink.

DETAILED DESCRIPTION OF THE INVENTION

Post-Treatment Liquid for Inkjet Recording

Figure 1:
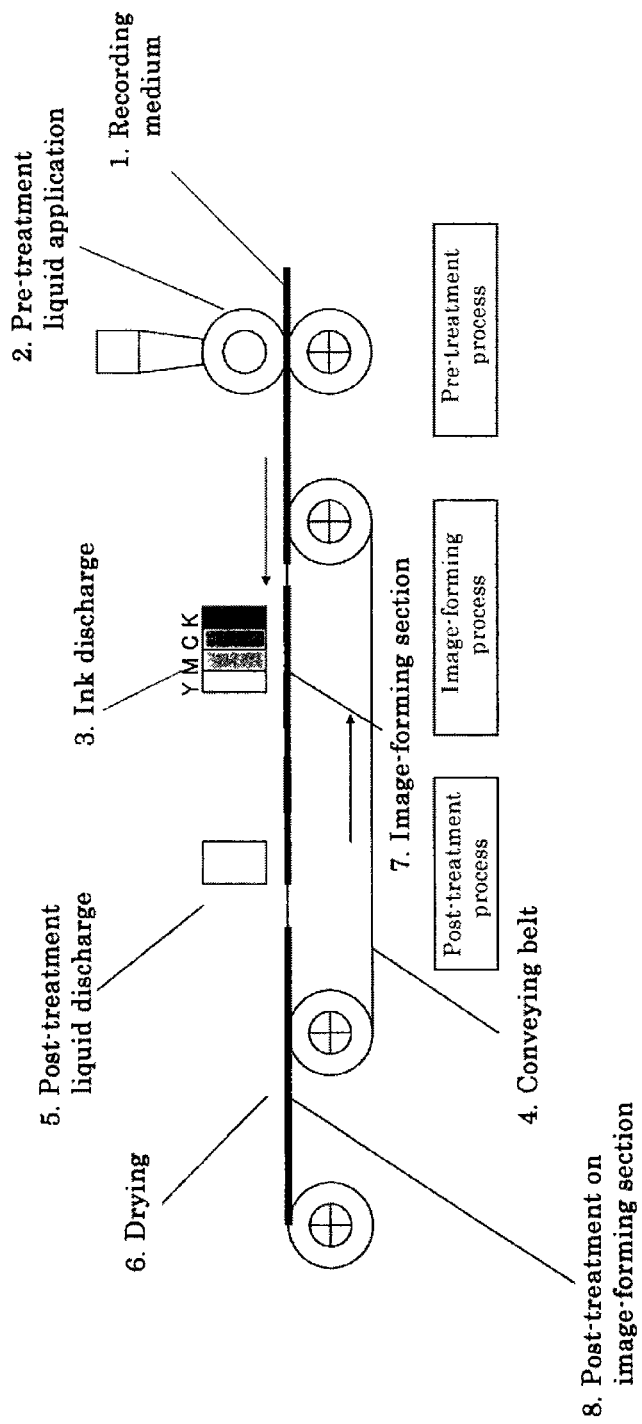
FIG. 1 is a schematic diagram illustrating one example of an overall configuration of an image forming method of the present invention (natural drying).

A post-treatment liquid for inkjet recording of the present invention (hereinafter, it may be abbreviated as a post-treatment liquid) includes a urethane resin, a fluorosurfactant, a water-soluble organic solvent and water, and it further includes other components according to necessity.

<Urethane Resin>

The urethane resin is a component essential for imparting image scratch resistance to an image-forming section. A mixing ratio thereof is preferably 10% by mass to 90% by mass of the overall post-treatment liquid. Sufficient image scratch resistance may be imparted when it is within this range. Also, image gloss may be controlled by controlling particle diameter and smoothness during film formation of the urethane resin.

The urethane resin is not particularly restricted and may be appropriately selected according to purpose. Nonetheless, an anionic self-emulsifying urethane resin having superior dispersion stability is preferable, and an anionic self-emulsifying ether-based urethane resin is more preferable in view of film formation, strength and bending properties in imparting post-treatment liquid to the image-forming section.

An average particle diameter of the ether-based urethane resin is not particularly restricted and may be appropriately selected according to purpose. Nonetheless, it is preferably 10 nm to 300 nm, more preferably 10 nm to 100 nm, and particularly preferably 10 nm to 80 nm. When the average particle diameter is less than 10 nm, viscosity of the resin may be too high for discharging in an inkjet printer. Also, when the average particle diameter exceeds 300 nm, particles may clog in a nozzle of an inkjet printer, causing discharge failure.

Also, a glass transition temperature of the ether-based urethane resin is not particularly restricted and may be appropriately selected according to purpose. Nonetheless, it is preferably −50° C. to 150° C., and more preferably −10° C. to 30° C. When it is 150° C. or less, sufficient scratch resistance may be obtained. However, the glass transition temperature of less than −50° C. is not preferable since the film is too soft, decreasing scratch resistance. Here, the glass transition temperature may be measured by DSC (differential scanning calorimetry) or TMA (thermomechanical analysis).

A minimum film-forming temperature (MFT) of the ether-based urethane resin is not particularly restricted and may be appropriately selected according to purpose. Nonetheless, it is preferably 25° C. or less. With the minimum film-forming temperature of the ether-based urethane resin of 25° C. or less, film formation may be carried out at 25° C. or less, and binding to paper fiber automatically proceeds without heating or drying a recording medium with image formation. Here, the "minimum film-forming temperature" above means a minimum temperature at which a transparent, continuous film is formed when aqueous emulsion particles obtained by dispersing ether-based urethane resin particles in water is flown thinly on a plate of metal such as aluminum and its temperature is increased.

As the ether-based urethane resin, those appropriately synthesized may be used, or commercially available products may be used. These may be used alone or in combination of two or more. Examples of the ether-based urethane resin include those described in JP-A No. 2009-67907, JP-A No. 2009-173805, and JP-A No. 2009-161726. Also, examples of the commercially available products include: W5661, XW-75-W932, manufactured by Mitsui Chemicals Inc.; and SF460S, manufactured by Nippon Unicar Co., Ltd.

<Fluorosurfactant>

The fluorosurfactant is added for applying the post-treatment liquid uniformly on the image-forming section. With the presence of the fluorosurfactant, wetting and spreading of dots of the post-treatment liquid after landing improve, and uniformity improves.

The fluorosurfactant is not particularly restricted and may be appropriately selected according to purpose. Nonetheless, those having 2 to 16 fluorine-substituted carbon atoms are preferable, and those having 4 to 16 fluorine-substituted carbon atoms are more preferable. An effect of fluorine may not be obtained with those having less than two fluorine-substituted carbon atoms, and problems of ink storage stability may occur with those having fluorine-substituted carbon atoms exceeding. These may be used alone or in combination of two or more.

Examples of the fluorosurfactant include: a perfluoroalkyl phosphate ester compound; a perfluoroalkyl ethylene oxide adduct; and a polyoxyalkylene ether polymer compound having a perfluoroalkyl ether group in a side chain.

Among these, the polyoxyalkylene ether polymer compound having a perfluoroalkyl ether group in a side chain is particularly preferable since it has less foaming property. A fluorosurfactant represented by General Formula (1) below is further preferable.

General Formula (1)

where, in General Formula (1), m represents an integer of 1 to 10, and n represents an integer of 1 to 40.

Examples of the perfluoroalkyl phosphate ester compound include a perfluoroalkyl phosphate ester and a salt of perfluoroalkyl phosphate ester.

Examples of the polyoxyalkylene ether polymer compound having a perfluoroalkyl ether group in a side chain include: a polyoxyalkylene ether polymer having a perfluoroalkyl ether group in a side chain; a sulfate salt of a polyoxyalkylene ether polymer having a perfluoroalkyl ether group in a side chain; and a salt of a polyoxyalkylene ether polymer having a perfluoroalkyl ether group in a side chain.

A counterion in the salts of these fluorosurfactants is not particularly restricted and may be appropriately selected according to purpose. Nonetheless, examples thereof include Li, Na, K, $NH_4$, $NH_3CH_2CH_2OH$, $NH_2(CH_2CH_2OH)_2$, and $NH(CH_2CH_2OH)_3$.

As specific examples of the fluorosurfactant, compounds represented by General Formulae (2) to (10) are favorably used.

(1) Anionic Fluorosurfactant

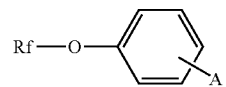

General Formula (2)

where, in General Formula (2), Rf represents a mixture of fluorine-containing hydrophobic groups represented by the following structural formulae; A represents —$SO_3X$, —COOX, or —$PO_3X$ [where X is a counteranion, representing specifically H, Li, Na, K, $NH_4$, $NH_3CH_2CH_2OH$, $NH_2(CH_2CH_2OH)_2$, or $NH(CH_2CH_2OH)_3$].

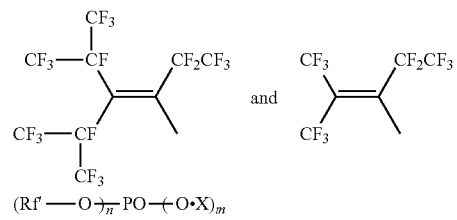

General Formula (3)

where, in General Formula (3), Rf' represents a fluorine-containing group represented by the following structural formula; X represents the same as X in General Formula (2); n represents an integer of 1 or 2, and m represents 2−n.

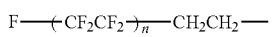

where, in the formula, n represents an integer of 3 to 10.

Rf'—S—CH$_2$CH$_2$—COO.X    General Formula (4)

where, in General Formula (4), Rf' represents the same as Rf' in General Formula (3), and X represents the same as X in General Formula (2).

Rf'—SO$_3$.X    General Formula (5)

where, in General Formula (5), Rf' represents the same as Rf in General Formula (3), and X represents the same as X in General Formula (2).

(2) Nonionic Fluorosurfactant

    General Formula (6)

where, in General Formula (6), Rf represents the same as Rf in General Formula (2), and n represents an integer of 5 to 20.

    General Formula (7)

where, in General Formula (7), Rf' represents the same as Rf' in General Formula (3), and n represents an integer of 1 to 40.

(3) Amphoteric Fluorosurfactant

General Formula (8)

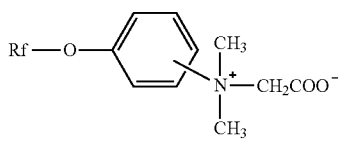

where, in General Formula (8), Rf represents the same as Rf in General Formula (2).

(4) Oligomer-Type Fluorosurfactant

General Formula (9)

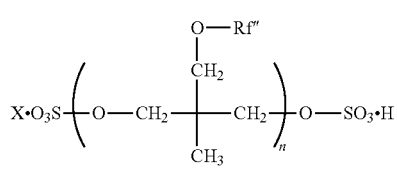

where, in General Formula (9), Rf'' represents a fluorine-containing group represented by the structural formula below; n represents an integer of 1 to 10; and X represents the same as X in General Formula (2).

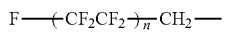

where, in the formula, n represents an integer of 1 to 4.

General Formula (10)

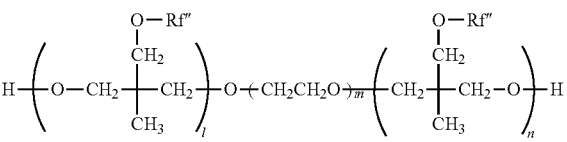

where, in General Formula (10), Rf'' represents the same as Rf'' in General Formula (9); and l represents an integer of 0 to 10, m represents an integer of 0 to 10, and n represents an integer of 0 to 10 (where l+n is an integer of 1 or greater).

As the fluorosurfactant, those appropriately synthesized may be used, or commercially available products may be used. Examples of the commercially available products include: SURFLON (registered trademark) S-111, S-112, S-113, S-121, S-131, S-132, S-141, S-145 (all manufactured by Asahi Glass Co., Ltd.); FLUORAD FC-93, FC-95, FC-98, FC-129, FC-135, FC-170C, FC-430, FC-431 (all manufactured by Sumitomo 3M Ltd.); MEGAFACE (registered trademark) F-470, F-1405, F-474 (all manufactured by DIC Corporation); ZONYL (registered trademark) TBS, FSP, FSA, FSN-100, FSN, FSO-100, FSO, FS-300, UR (all manufactured by DuPont Co.); FT-110, FT-250, FT-251, FT-400S, FT-150, FT-400SW (all manufactured by Neos Company Ltd.); and POLYFOX (registered trademark) PF-136A, PF-156A, PF-151N, PF-154, PF-159 (all manufactured by OMNOVA Solutions Inc.). Among these, FS-300 manufactured by DuPont Co., FT-110, FT-250, FT-251, FT-400S, FT-150, FT-400SW manufactured by Neos Company Ltd., and POLYFOX PF-151N manufactured by OMNOVA Solutions Inc. are particularly preferable in view of favorable printing quality, especially in view of significant improvement in color development and level dyeing to paper.

A content of the fluorosurfactant in the post-treatment liquid is preferably 0.001% by mass to 5% by mass, and more preferably 0.05% by mass to 1% by mass. When the content is less than 0.001% by mass, an effect of adding a surfactant may decrease. When it exceeds 5% by mass, no difference in the effect may be seen despite the increased amount of addition.

<Water Soluble Organic Solvent>

The water-soluble organic solvent is not particularly restricted and may be appropriately selected according to purpose. For example, those described hereinafter for a pre-treatment liquid may also be used. The water-soluble organic solvent may be used alone or in combination of two or more. A mixing ratio of the water-soluble organic solvent in the post-treatment liquid is, similarly to the pre-treatment liquid described hereinafter, preferably 10% by mass to 80% by mass, and more preferably 15% by mass to 60% by mass.

<Water>

The water is not particularly restricted and may be appropriately selected according to purpose. For example, pure water such as ion-exchanged water, ultrafiltered water, reverse osmosis water and distilled water, or ultrapure water may be used. These may be used alone or in combination of two or more.

<Other Components>

The other components are not particularly restricted and may be appropriately selected according to purpose. Examples thereof include a penetrating agent, surfactant, water-dispersible resin particles, a water-soluble polymer, a defoamer, an antiseptic and fungicide, a rust inhibitor, a pH adjuster, a resistivity modifier, an antioxidant, an ultraviolet absorber, an oxygen absorber, a light stabilizer, and a viscosity modifier. These may be used alone or in combination of two or more.

(Image Forming Method)

An image forming method of the present invention is an image forming method by inkjet recording, including an image forming process which forms an image on a recording medium using an ink and a post-treatment process which coats an image-forming section formed by the image forming process by discharging a post-treatment liquid for inkjet recording of the present invention, and it further includes a pre-treatment process which subjects the recording medium to a pre-treatment with a pre-treatment liquid before the image forming process according to necessity.

<Recording Medium>

The recording medium is not particularly restricted and may be appropriately selected according to purpose. Examples thereof include plain paper having sizing degree of 10 s or greater and air permeability of 5 s to 50 s, which does not include a coating layer and is generally used as copy paper. However, the post-treatment liquid of the present invention is particularly effective in inkjet recording on offset printing paper using a water-based ink.

—Offset Printing Paper—

The offset printing paper is coated paper that is used in commercial printing such as so-called art paper (A0, A1), A2 coated paper, A3 coated paper, B2 coated paper, light-weight coated paper, and slightly coated paper, denoting paper used for offset printing and gravure printing.

The art paper is not particularly restricted and may be appropriately selected according to purpose. Examples thereof include: OK Kanefuji N, OK Kanefuji-R40N, SA Kanefuji N, Satin Kanefuji N, Satin Kanefuji-R40N, Ultrasatin Kanefuji N, Ultra OK Kanefuji N, Kanefuji One Side (all manufactured by Oji Paper Co., Ltd.); NPi Special Art, NPi Super Art, NPi Super Dull, NPi Dull Art (all manufactured by Nippon Paper Industries Co., Ltd.); Utrillo Super Art, Utrillo Super Dull, Utrillo Premium (all manufactured by Daio Paper Corporation); High-Quality Art, Tokuhishi Art, Super Mat Art A, High-Quality Dull Art A (all manufactured by Mitsubishi Paper Mills Ltd.); Raicho Super Art N, Raicho Super Art MN, Raicho Special Art, Raicho Dull Art N (all manufactured by Chuetsu Pulp & Paper Co., Ltd.).

The A2 coated paper is not particularly restricted and may be appropriately selected according to purpose. Examples thereof include: OK Top Coat+(plus), OK Top Coat S, OK Casablanca, OK Casablanca V, OK Trinity, OK Trinity NaVi, New Age, New Age W, OK Top Coat Mat N, OK Royal Coat, OK Top Coat Dull, Z Coat, OK Kasahime, OK Kasao, OK Kasao Satin, OK Top Coat+, OK Non-wrinkle, OK Coat V, OK Coat N Green 100, OK Mat Coat Green 100, New Age Green 100, Z Coat Green 100 (all manufactured by Oji Paper Co., Ltd.); Aurora Coat, Shiraoi Mat, Imperial Mat, Silver Diamond, Recycle Coat 100, Cycle Mat 100 (all manufactured by Nippon Paper Industries Co., Ltd.); Mu Coat, Mu White, Mu Mat, White Mu Mat (all manufactured by Hokuetsu Paper Mills Ltd.); Raicho Coat N, Regina Raicho Coat 100, Raicho Mat Coat N, Regina Raicho Mat 100 (all manufactured by Chuetsu Pulp & Paper Co., Ltd.); Pearl Coat, White Pearl Coat N, New V Mat, White New V Mat, Pearl Coat REW, White Pearl Coat NREW, New V Mat REW, White New V Mat REW (all manufactured by Mitsubishi Paper Mills Ltd.).

The A3 coated (light-weight coated) paper is not particularly restricted and may be appropriately selected according to purpose. Examples thereof include: OK Coat L, Royal Coat L, OK Coat LR, OK White L, OK Royal Coat LR, OK Coat L Green 100, OK Mat Coat L Green 100 (all manufactured by Oji Paper Co., Ltd.); Easter DX, Recycle Coat L100, Aurora L, Recycle Mat L100, <SSS> Energy White (all manufactured by Nippon Paper Industries Co., Ltd.); Utrillo Coat L, Matisse Coat (all manufactured by Daio Paper Corporation); Hi Alpha, Alpha Mat, (N) Kinmari L, Kinmari HiL (all manufactured by Hokuetsu Paper Mills Ltd.); N Pearl Coat L, N Pearl Coat LREW, Swing Mat REW (all manufactured by Mitsubishi Paper Mills Ltd.); Super Emine, Emine, Chaton (all manufactured by Chuetsu Pulp & Paper Co., Ltd.).

The B2 coated (medium-quality coated) paper is not particularly restricted and may be appropriately selected according to purpose. Examples thereof include OK Medium Quality Coat, (F) MCOP, OK Astro Gloss, OK Astro Dull, OK Astro Mat (all manufactured by Oji Paper Co., Ltd.); King O (manufactured by Nippon Paper Industries Co., Ltd.).

The slightly coated paper is not particularly restricted and may be appropriately selected according to purpose. Examples thereof include: OK Royal Light S Green 100, OK Ever Light Coat, OK Ever Light R, OK Ever Green, Clean Hit MG, OK Microcoated Super Eco G, Eco Green Dull, OK Microcoated Mat Eco G100, OK Star Light Coat, OK Soft Royal, OK Bright, Clean Hit G, Yamayuri Bright, Yamayuri Bright G, OK Aqua Light Coat, OK Royal Light S Green 100, OK Bright (rough, gloss), Snow Mat, Snow Mat DX, OK Kasahime, OK Kasayuri (all manufactured by Oji Paper Co., Ltd.); Pyrene DX, Pegasus Hyper 8, Aurora S, Andes DX, Super Andes DX, Space DX, Seine DX, Special Gravure DX, Pegasus, Silver Pegasus, Pegasus Harmony, Greenland DX100, Super Greenland DX100, <SSS> Energy Soft, <SSS> Energy Light, EEHenry (all manufactured by Nippon Paper Industries Co., Ltd.); Kant Excel, Excel Super B, Excel Super C, Kant Excel Bal, Utrillo Excel, Heine Excel, Dante Excel (all manufactured by Daio Paper Corporation); Cosmo Ace (manufactured by Nippon Daishowa Paperboard Co., Ltd.); Semi-Jo L, Hi Beta, Hi Gamma, Shiromari L, Hamming, White Hamming, Semi-Jo HiL, Shiromari HiL (all manufactured by Hokuetsu Paper Mills Ltd.); Ruby Light HREW, Pearl Soft, Ruby Light H (all manufactured by Mitsubishi Paper Mills Ltd.); Chaton, Ariso, Smash (all manufactured by Chuetsu Pulp & Paper Co., Ltd.); Star Chemy, Chemy Super (all manufactured by Marusumi Paper Co., Ltd.).

<Pre-Treatment Liquid>

The pre-treatment liquid includes a water-soluble organic solvent, water, and any one of an aliphatic organic acid salt and an inorganic metal salt, and it further includes other components according to necessity.

—Aliphatic Organic Acid Salt—

The aliphatic organic acid salt is not particularly restricted and may be appropriately selected according to purpose. Examples thereof include sodium L-aspartate, magnesium L-aspartic acid, calcium ascorbate, sodium L-ascorbate, sodium succinate, disodium succinate, diammonium succinate, aluminum citrate, potassium citrate, calcium citrate, triammonium citrate, tripotassium citrate, trisodium citrate, diammonium citrate, disodium citrate, zinc lactate, aluminum lactate, ammonium lactate, potassium lactate, calcium lactate, sodium lactate, magnesium lactate, potassium tartrate, calcium tartrate, DL-sodium tartrate, and sodium potassium tartrate. These may be used alone or in combination of two or more.

—Inorganic Metal Salt—

The inorganic metal salt is not particularly restricted and may be appropriately selected according to purpose Examples thereof include magnesium sulfate, aluminum sulfate, manganese sulfate, nickel sulfate, iron(II) sulfate, copper(II) sulfate, zinc sulfate, iron(II) nitrate, iron (III) nitrate, cobalt nitrate, strontium nitrate, copper(II) nitrate, nickel(II) nitrate, lead(II) nitrate, manganese(II) nitrate, nickel(II) chloride, calcium chloride, tin(II) chloride, strontium chloride, barium chloride, magnesium chloride, sodium sulfate, potassium sulfate, lithium sulfate, sodium hydrogen sulfate, potassium bisulfate, sodium nitrate, potassium nitrate, sodium carbonate, potassium carbonate, sodium hydrogen carbonate, potassium bicarbonate, sodium chloride, potassium chloride. These may be used alone or in combination of two or more.

An added amount of the aliphatic organic acid salt or the inorganic metal salt is not particularly restricted and may be appropriately selected according to purpose. Nonetheless, it is preferably 0.1% by mass to 30% by mass, and more preferably 1% by mass to 20% by mass of the total pre-treatment liquid. When it exceeds 30% by mass, the aliphatic organic acid salt may not dissolve sufficiently, resulting in precipitation. When it is less than 0.1% by mass, an effect of increased image density may decrease.

—Water-Soluble Organic Solvent—

The water-soluble organic solvent is not particularly restricted and may be appropriately selected according to purpose. Examples thereof include polyhydric alcohols having an equilibrium moisture content of 30% by mass or greater in an environment with a temperature of 23° C. and a humidity of 80%. Specific examples of such a water-soluble organic solvent include 1,2,3-butanetriol (bp: 175° C./33 hPa, 38% by mass), 1,2,4-butanetriol (bp: 190° C. to 191° C./24 hPa, 41% by mass), glycerin (bp: 290° C., 49% by mass), diglycerin (bp: 270° C./20 hPa, 38% by mass), triethylene glycol (bp: 285° C., 39% by mass), tetraethylene glycol (bp: 324° C. to 330° C., 37% by mass), diethylene glycol (bp: 245° C., 43% by mass), 1,3-butanediol (bp: 203° C. to 204° C., 35% by mass). These may be used alone or in combination of two or more. Among the water-soluble organic solvents, glycerin and 1,3-butanediol are preferable since they become less viscous when including moisture. Also, use of at least one of glycerin and 1,3-butanediol by 50% by mass or more of the whole water-soluble organic solvent is more preferable since it is superior in terms of ensuring discharge stability or preventing fixation of a waste ink in a supporting device of an ink discharging apparatus. The water-soluble organic solvent may also serve as a wetting agent.

Also, examples of a water-soluble organic solvent or a wetting agent other than above which may be used in combination according to necessity include polyhydric alcohols, polyhydric alcohol alkyl ethers, polyhydric alcohol aryl ethers, nitrogen-containing heterocyclic compounds, amides, amines, sulfur-containing compounds, propylene carbonate, and ethylene carbonate.

The polyhydric alcohols are not particularly restricted and may be appropriately selected according to purpose. Examples thereof include dipropylene glycol (bp: 232° C.), 1,5-pentanediol (bp: 242° C.), 3-methyl-1,3-butanediol (bp: 203° C.), propylene glycol (bp: 187° C.), 2-methyl-2,4-pentanediol (bp: 197° C.), ethylene glycol (bp: 196° C. to 198° C.), tripropylene glycol (bp: 267° C.), hexylene glycol (bp: 197° C.), polyethylene glycol (viscous liquid to solid), polypropylene glycol (bp: 187° C.), 1,6-hexanediol (bp: 253° C. to 260° C.), 1,2,6-hexanetriol (bp: 178° C.), trimethylolethane (solid; mp: 199° C. to 201° C.), and trimethylolpropane (solid; mp: 61° C.).

The polyhydric alcohol alkyl ethers are not particularly restricted and may be appropriately selected according to purpose. Examples thereof include ethylene glycol monoethyl ether (bp: 135° C.), ethylene glycol monobutyl ether (bp: 171° C.), diethylene glycol monomethyl ether (bp: 194° C.), diethylene glycol monoethyl ether (bp: 197° C.), diethylene glycol monobutyl ether (bp: 231° C.), ethylene glycol mono-2-ethylhexyl ether (bp: 229° C.), and propylene glycol monoethyl ether (bp: 132° C.).

Examples of the polyhydric alcohol aryl ethers include ethylene glycol monophenyl ether (bp: 237° C.), and ethylene glycol monobenzyl ether.

The nitrogen-containing heterocyclic compounds are not particularly restricted and may be appropriately selected according to purpose. Examples thereof include 2-pyrrolidone (bp: 250° C., mp: 25.5° C.), N-methyl-2-pyrrolidone (bp: 202° C.), 1,3-dimethyl-2-imidazolidinone (bp: 226° C.), ε-caprolactam (bp: 270° C.), and γ-butyrolactone (bp: 204° C. to 205° C.).

The amides are not particularly restricted and may be appropriately selected according to purpose Examples thereof include formamide (bp: 210° C.), N-methylformamide (bp: 199° C. to 201° C.), N,N-dimethylformamide (bp: 153° C.), and N,N-diethylformamide (bp: 176° C. to 177° C.).

The amines are not particularly restricted and may be appropriately selected according to purpose. Examples thereof include monoethanolamine (bp: 170° C.), diethanolamine (bp: 268° C.), triethanolamine (bp: 360° C.), N,N-dimethylmonoethanolamine (bp: 139° C.), N-methyldiethanolamine (bp: 243° C.), N-methylethanolamine (bp: 159° C.), N-phenylethanolamine (bp: 282° C. to 287° C.), and 3-aminopropyldiethylamine (bp: 169° C.).

The sulfur-containing compounds are not particularly restricted and may be appropriately selected according to purpose. Examples thereof include dimethylsulfoxide (bp: 139° C.), sulfolane (bp: 285° C.), and thiodiglycol (bp: 282° C.).

—Water—

The water is not particularly restricted and may be appropriately selected according to purpose. For example, pure water such as ion-exchanged water, ultra filtered water, reverse osmosis water and distilled water, or ultrapure water may be used. These may be used alone or in combination of two or more.

—Other Components—

The other components are not particularly restricted and may be appropriately selected according to purpose. Examples thereof include a wetting agent, a penetrating agent, and an anticeptic and a rust inhibitor which are also used in an ink described hereinafter. Here, there are cases where the water-soluble organic solvent also serves as a wetting agent, but a separate wetting agent may be added. Also, as a wetting agent, a solid wetting agent may be used. These may be used alone or in combination of two or more.

—Solid Wetting Agent—

The solid wetting agent is not particularly restricted and may be appropriately selected according to purpose. Nonetheless, sugars are preferable.

The sugars are not particularly restricted and may be appropriately selected according to purpose. Examples thereof include monosaccharides, disaccharides, oligosaccharides (including trisaccharide, tetrasaccharides), and polysaccharides. Specific examples thereof include glucose, mannose, fructose, ribose, xylose, arabinose, galactose, maltose, cellobiose, lactose, sucrose, trehalose, and maltotriose. Here, the term "polysaccharides" refers to sugars in a broad sense of the term, and it is used to mean substances present extensively in the nature, including α-cyclodextrin, cellulose. Also, examples of derivatives of these sugars include reducing sugars of the sugars (e.g. sugar alcohols [General Formula: $HOCH_2(CHOH)_nCH_2OH$ (where n represents an integer of 2 to 5)], and oxidized sugar (e.g. aldonic acid, uronic acid)), amino acids, and thioacids. Among these, sugar alcohols are preferable, and specific examples thereof include maltitol and sorbit. These may be used alone or in combination of two or more.

A content of the water-soluble organic solvent or a content of the water-soluble organic solvent and the wetting agent in the pre-treatment liquid are not particularly restricted and may be appropriately selected according to purpose. Nonetheless, it is preferably 10% by mass to 80% by mass, and further preferably 15% by mass to 60% by mass. When it exceeds 80% by mass, drying defects may occur on the recording medium depending on the types of the water-soluble organic solvent or the wetting agent. When it is less than 10% by mass, a composition of the pre-treatment liquid may largely change due to moisture evaporation in the pre-treatment process.

—Penetrating Agent—

The penetrating agent is not particularly restricted and may be appropriately selected according to purpose. Nonetheless, a non-wetting polyol or glycol ether having 8 to 11 carbon atoms is preferable. It more preferably has a solubility of 0.2% by mass to 5.0% by mass in water at 25° C., and 2-ethyl-1,3-hexanediol [solubility: 4.2% (25° C.)], 2,2,4-trimethyl-1,3-pentanediol [solubility: 2.0% (25° C.)] are particularly preferable. These may be used alone or in combination of two or more.

The non-wetting polyol is not particularly restricted and may be appropriately selected according to purpose. Nonetheless, examples thereof include 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

The penetrating agent other than the above that can be used in combination is not particularly restricted as long as it is dissolved in the pre-treatment liquid for adjusting to desired physical properties, and it may be appropriately selected according to purpose. Examples thereof include: alkyl and aryl ethers of a polyhydric alcohol such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; and lower alcohols such as ethanol.

A content of the penetrating agent in the pre-treatment liquid is not particularly restricted and may be appropriately selected according to purpose. Nonetheless, it is preferably 0.1% by mass to 5.0% by mass. When the content is less than 0.1% by mass, the penetrating agent may not have an effect for the pre-treatment liquid to penetrate. When the content exceeds 5.0% by mass, the penetrating agent separates from the solvent due to its low solubility to the solvent, which may result in an effect of improving penetration being saturated.

<Ink>

The ink is not particularly restricted as long as it may be used for inkjet recording, and it may be appropriately selected according to purpose. Nonetheless, a water-based ink is preferable in view of noticeable effect of the post-treatment liquid.

—Water-Based Ink—

The water-based ink includes a water-dispersible colorant, a water-soluble organic solvent, a surfactant, a penetrating agent and water, and it further includes other components according to necessity.

—Water-Dispersible Colorant—

The water-dispersible colorant is not particularly restricted and may be appropriately selected according to purpose. A pigment is preferable in view of weather resistance, but a dye may be used in combination for color adjustment within a range that it does not degrade weather resistance.

The pigment is not particularly restricted and may be appropriately selected according to purpose. Examples thereof include black or color inorganic pigments and organic pigments. These may be used alone or in combination of two or more.

The inorganic pigments are not particularly restricted and may be appropriately selected according to purpose. Examples thereof include titanium oxide, iron oxide, calcium carbonate, barium sulfate, aluminum hydroxide, barium yellow, cadmium red, chrome yellow, and carbon black manufactured by a heretofore known method such as contact method, furnace method and thermal method. These may be used alone or in combination of two or more.

The organic pigments are not particularly restricted and may be appropriately selected according to purpose. Examples thereof include azo pigments (including azo lake, insoluble azo pigments, condensed azo pigments, chelate azo pigments, etc.), polycyclic pigments (e.g. phthalocyanine pigments, perylene pigments, perinone pigments, anthraquinone pigments, quinacridone pigments, dioxazine pigments, indigo pigments, thioindigo pigments, isoindolinone pigments, quinophthalone pigments, etc.), dye-type chelate (e.g. basic dye-type chelate, acid dye-type chelate, etc.), nitro pigments, nitroso pigments, and aniline black. These may be used alone or in combination of two or more.

Among these pigments, those having high affinity with water are preferable.

Specific examples of the preferable black pigments include: carbon blacks such as furnace black, lampblack, acetylene black, and channel black (C. I. Pigment Black 7); metals such as copper and iron (C.I. Pigment Black 11); metal oxides such as titanium oxide; organic pigments such as aniline black (C.I. Pigment Black 1).

Also, specific examples of the preferable color pigments include: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 138, 150, 151, 153, 183; C.I. Pigment Orange 5, 13, 16, 17, 36, 43, 51; C.I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 185, 190, 193, 209, 219; C.I. Pigment Violet 1 (Rhodamine Lake), 3, 5:1, 16, 19, 23, 38; C.I. Pigment Blue 1, 2, 15, 15:1, 15:2, 15:3 (Phthalocyanine Blue), 16, 17:1, 56, 60, 63; and C.I. Pigment Green 1, 4, 7, 8, 10, 17, 18, 36.

When the water-dispersible colorant is a pigment-based colorant, preferable embodiments thereof include the following first and second embodiments. In particular, a water-dispersible colorant of the first embodiment is preferably used.

The first embodiment includes a polymer emulsion in which a water-insoluble or poorly water-soluble pigment is included in polymeric particles (aqueous dispersion of polymeric particles including a pigment).

The second embodiment includes a pigment which includes at least one type of a hydrophilic group on a surface thereof and exhibits water-dispersibility in the absence of a dispersant (which may also be referred to as a "self-dispersible pigment" hereinafter).

Here, in the second embodiment, it is preferable to include a water-dispersible resin described hereinafter.

As the water-dispersible colorant of the first embodiment, it is preferable to use, in addition to the pigment, a polymer emulsion in which a pigment is included in polymeric particles. The polymer emulsion in which a pigment is included in polymeric particles is that a pigment is encapsulated in polymeric particles or that a pigment is adsorbed on a surface of polymeric particles. In this case, it is not necessary that all the pigment is encapsulated or adsorbed, and a part of the pigment may be dispersed in the emulsion.

Examples of a polymer which forms the polymer emulsion include a vinyl polymer, a polyester polymer and a polyurethane polymer, and those preferable are the vinyl polymer and the polyester polymer. For example, polymers disclosed in JP-A No. 2000-53897 and JP-A No. 2001-139849 may be used.

As the water-dispersible colorant of the second embodiment, those subjected to surface modification such that at least one type of a hydrophilic group is bound to a surface of the pigment directly or via other atomic groups. As the surface modification, a method that a specific functional group (functional groups such as sulfonic group and carboxyl group) is chemically bound to a surface of the pigment or a wet oxidation treatment is carried out using at least any one of hypohalous acid and a salt thereof is used. Among these, an embodiment that the pigment having a carboxyl group bound to a surface thereof is dispersed in water is particularly preferable. Since the pigment is surface-modified in this way to have a carboxyl group bound thereto, dispersion stability improves, and in addition, high print quality may be obtained as well as water resistance of the recording medium after printing further improves.

Also, a water-based ink including this self-dispersible pigment of the second embodiment has superior redispersibility after drying, and thus favorable printing may be carried out easily by a simple cleaning operation without occurrence of clogging even though ink moisture near an inkjet head nozzle has evaporated after a long period of pause of printing.

A volume average particle diameter (D50) of the self-dispersible pigment in the ink is preferably 0.01 μm to 0.16 μm.

The self-dispersible pigment is preferably ionic, and a pigment anionically charged by an anionic hydrophilic group, etc. is more preferable.

The anionic hydrophilic group is not particularly restricted and may be appropriately selected according to purpose. Examples thereof include —COOM, —SO$_3$M, —PO$_3$HM, —PO$_3$M$_2$, —SO$_2$NH$_2$, —SO$_2$NHCOR (where M represents an alkali metal, an ammonium or an organic ammonium; and R represents an alkyl group having 1 to 12 carbon atoms, a phenyl group which may have a substituent or a naphthyl group which may have a substituent). Among these, color pigments having —COOM, —SO$_3$M bound to a surface thereof are preferable.

Also, the alkali metal 'M' in the hydrophilic group is not particularly restricted and may be appropriately selected according to purpose. Examples thereof include lithium, sodium, and potassium. The organic ammonium 'M' in the hydrophilic group is not particularly restricted and may be appropriately selected according to purpose. Examples thereof include mono- to trimethylammonium, mono- to trimethyl ammonium and mono- to trimethanolammonium.

A method for obtaining the anionically charged color pigment is not particularly restricted and may be appropriately selected according to purpose. Examples thereof include a method of introducing —COONa to a surface of the color pigment. Examples of the method for introducing —COONa to a surface of the color pigment include: a method of oxidizing the color pigment with sodium hypochlorite; a method of sulfonation; and a method of reacting with a diazonium salt.

The anionic hydrophilic group may be bound to a surface of the pigment via other atomic groups. The other atomic groups are not particularly restricted and may be appropriately selected according to purpose. Examples thereof include an alkyl group having 1 to 12 carbon atoms, a phenyl group which may have a substituent and a naphthyl group which may have a substituent.

Specific examples of the case where the anionic hydrophilic group is bound to a surface of carbon black via other atomic groups include: —C$_2$H$_4$COOM (where M represents an alkali metal or a quaternary ammonium) and -PhSO$_3$M (where Ph represents a phenyl group; M represents an alkali metal or a quaternary ammonium).

A content of the colorant in the water-based ink is not particularly restricted and may be appropriately selected according to purpose. Nonetheless, as a solid content, it is preferably 2% by mass to 15% by mass, and more preferably 3% by mass to 12% by mass. The content of less than 2% by mass or exceeding 15% by mass is not preferable since the ink with the former may have decreased color developing property and image density and with the latter have poor discharge property due to increased viscosity.

—Water Soluble Organic Solvent—

The water-soluble organic solvent is not particularly restricted and may be appropriately selected according to purpose. Nonetheless, the water-soluble organic solvent same as those for the pre-treatment liquid are favorably used. Similarly to the pretreatment liquid, there are cases where the water-soluble organic solvent also serves as a wetting agent, but it is also possible to add a separate wetting agent. Also, it is possible to use a solid wetting agent as the wetting agent.

A mass ratio of the water dispersible colorant to the water-soluble organic solvent affects ink discharge stability from a head. For example, when a solid content of the water-dispersible colorant is large despite a small amount of the water-soluble organic solvent, evaporation of water near an ink meniscus in the nozzle may proceed, resulting in poor discharge.

A content of the water-soluble organic solvent in the water-based ink is not particularly restricted and may be appropriately selected according to purpose. Nonetheless, it is preferably 20% by mass to 50% by mass, and more preferably 20% by mass to 45% by mass. When the content is less than 20% by mass, discharge stability may decrease, or waste ink may fix in a supporting device of an inkjet recording apparatus. Also, when the content exceeds 50% by mass, drying properties on paper may be inferior, and further letter quality on plain paper may decrease.

Examples of the preferable water-soluble organic solvent include glycerin, trimethylolpropane, ethylene glycol, diethylene glycol, triethylene glycol, propylene glycol, dipropylene glycol, tripropylene glycol, 1,2-butanediol, 1,3-butanediol, 2,3-butanediol, 1,4-butanediol, 3-methyl-1,3-butanediol, 1,2-pentanediol, 1,5-pentanediol, 1,2-hexanediol, 1,6-hexanediol, 2-methyl-2,4-hexanediol, 1,2-octanediol, 2-pyrrolidone, N-methyl-2-pyrrolidone, N-hydroxyethyl-2-pyrrolidone, tetramethyl urea, and urea.

—Surfactant—

The surfactant is not particularly restricted and may be appropriately selected according to purpose. Nonetheless, ones having dispersion stability not sacrificed, a low surface tension, and high penetration property and leveling property regardless of the types of the water-dispersible colorant and a combination with the water-soluble organic solvent are preferable. For example, an anionic surfactant, a non-ionic a surfactant, silicone surfactant and a fluorosurfactant are preferable. Among these, the silicone surfactant and the fluorosurfactant are particularly preferable. These surfactants may be used alone or in combination of two or more.

A content of the surfactant in the water-based ink is not particularly restricted and may be appropriately selected according to purpose. Nonetheless, it is preferably 0.01% by mass to 3.0% by mass, and more preferably 0.5% by mass to 2% by mass. When the content is less than 0.01% by mass, an effect of adding a surfactant may not be obtained. When it exceeds 3.0% by mass, penetration into a recording medium increases more than necessary, and decrease of image density and strikethrough may occur, especially with plain paper.

—Penetrating Agent—

The penetrating agent is not particularly restricted and may be appropriately selected according to purpose. Nonetheless, the penetrating agent same as those for the pre-treatment liquid may be preferably used.

A content of the penetrating agent in the water-based ink is not particularly restricted and may be appropriately selected according to purpose. Nonetheless, it is preferably 0.1% by mass to 4.0% by mass. When the content is less than 0.1% by mass, quick drying property may not be obtained, resulting in a blurred image. When it exceeds 4.0% by mass, dispersion stability of the colorant is impaired, and decrease of image density and strikethrough, e.g. easily clogged nozzle and excessive increase in penetration to a recording medium, may occur.

—Water—

The water is not particularly restricted and may be appropriately selected according to purpose. Examples thereof include: pure water such as ion-exchanged water, ultrafiltered water, reverse osmosis water and distilled water; and ultrapure water. These may be used alone or in combination of two or more.

—Other Components—

The other components are not particularly restricted and may be appropriately selected according to necessity. Examples thereof include a pH adjuster, an antiseptic and fungicide, a chelate reagent, a rust inhibitor, an antioxidant, an ultraviolet absorber, an oxygen absorber, and a light stabilizer. These may be used alone or in combination of two or more.

The pH adjuster is not particularly restricted as long as it may adjust a pH of the water-based ink being prepared to 7 to 11 without adversely affecting the ink. It may be appropriately selected according to necessity.

Examples of the pH adjuster include alcohol amines, hydroxides of an alkali metal element, hydroxides of ammonium, hydroxides of phosphonium, and carbonates of an alkali metal.

When the pH of the water-based ink is less than 7 or exceeds 11, a dissolved amount of an inkjet head an ink supply unit increases, which may cause defects such as alteration or leakage of the ink and discharge failure.

Examples of the alcohol amines include diethanolamine, triethanolamine, and 2-amino-2-ethyl-1,3-propanediol.

Examples of the hydroxides of an alkali metal element include lithium hydroxide, sodium hydroxide and potassium hydroxide.

Examples of the hydroxides of ammonium include ammonium hydroxide and quaternary ammonium hydroxide.

Examples of the hydroxides of phosphonium include quaternary phosphonium hydroxide.

Examples of the carbonates of an alkali metal include lithium carbonate, sodium carbonate and potassium carbonate.

The antiseptic and fungicide is not particularly restricted and may be appropriately selected according to necessity. Examples thereof include sodium dehydroacetate, sodium sorbate, 2-pyridinethiol 1-oxide sodium, sodium benzoate, and sodium pentachlorophenol.

The chelate reagent is not particularly restricted and may be appropriately selected according to necessity. Examples thereof include sodium ethylenediaminetetraacetate, sodium nitrilotriacetate, sodium hydroxyethylethylenediamine triacetate, sodium diethylenetriamine pentaacetate, and sodium uramildiacetate.

The rust inhibitor is not particularly restricted and may be appropriately selected according to necessity. Examples thereof include acid sulfite, sodium thiosulfate, ammonium thiodiglycolate, diisopropyl ammonium nitrite, pentaerythritol tetranitrate, and dicyclohexylammonium nitrite.

The antioxidant is not particularly restricted and may be appropriately selected according to necessity. Examples thereof include, a phenol-based antioxidant (including a hindered phenol-based antioxidant), an amine-based antioxidant, a sulfur-based antioxidant, and a phosphorus-based antioxidant.

The ultraviolet absorber is not particularly restricted and may be appropriately selected according to necessity. Examples thereof include a benzophenone-based ultraviolet absorber, a benzotriazole ultraviolet absorber, a salicylate-based ultraviolet absorber, a cyanoacrylate-based ultraviolet absorber, and a nickel complex salt-based ultraviolet absorber.

—Physical Properties of Water-Based Ink—

Physical properties of the water-based ink are not particularly restricted and may be appropriately selected according to purpose.

A viscosity of the water-based ink at 25° C. is preferably 5 mPa·s to 20 mPa·s. An effect of improved print density and letter quality may be obtained with the viscosity being 5 mPa·s or greater. At the same time, discharge property may be ensured with the viscosity suppressed to 20 mPa·s or less. Here, the viscosity may be measured at 25° C., for example, using a viscometer (RE-550L, manufactured by Toki Sangyo Co., Ltd.).

Also, static surface tension of the water-based ink at 25° C. is preferably 20 mN/m to 35 mN/m, and more preferably 20 mN/m to 30 mN/m. When the static surface tension is within the range of 20 mN/m to 35 mN/m, the ink has increased penetration, which is effective in reducing bleeding and resulting in favorable drying properties in printing on plain paper, and the ink is more easily placed on a pre-treatment layer, resulting in improved color development and white spots. However, when the static surface tension exceeds 35 mN/m, leveling of the ink on a recording medium is less likely to occur, and drying time may be longer.

—Color of Water-Based Ink—

A color of the water-based ink is not particularly restricted and may be appropriately selected according to purpose, and examples thereof include yellow, magenta, cyan, and black. A multi-color image may be formed by recording using an ink set as a combination of two or more colors, and a full-color image may be formed by recording using an ink set as a combination of all the colors.

—Production of Water-Based Ink—

The water-based ink is manufactured by dispersing or dissolving the water-dispersible colorant, the water-soluble organic solvent, the surfactant, the penetrating agent and the water, and moreover the other components according to necessity, in an aqueous medium, and further by stirring and mixing according to necessity. A method for the stirring and mixing is not particularly restricted and may be appropriately selected according to necessity, using a sand mill, a homogenizer, a ball mill, a paint shaker, an ultrasonic disperser, a stirrer using ordinary stirring blades, a magnetic stirrer, and a high-speed disperser, for example.

The image forming method applies a stimulus not only to the ink but also to the pre-treatment liquid and the post-treatment liquid to fly them (inkjet discharge), thereby an image may be recorded on the recording medium, or a pre-treatment liquid or a post-treatment liquid may be applied on the image-forming section. A method for flying is not particularly restricted, but nonetheless, various inkjet nozzles for ink discharge may be used.

An inkjet head includes a liquid chamber, a fluid resistance unit, a diaphragm and a nozzle member, at least a part of which is preferably formed of a material including silicon or nickel. Also, the inkjet nozzle has a nozzle diameter of nozzle diameter of preferably 30 μm or less, and more preferably 1 μm to 20 μm.

The stimulus is not particularly restricted as long as it may be generated by various stimulus generating units, and it may be appropriately selected according to purpose. Examples thereof include heat, pressure, vibration and light. These may be used alone or in combination of two or more. Among these, heat and pressure are favorable.

Here, examples of the stimulus generating units include a heating apparatus, a pressurizing apparatus, a piezoelectric element, a vibration generating apparatus, an ultrasonic oscillator, and a light, and specific examples thereof include: a piezo actuator such as piezoelectric element; a thermal actuator which makes use of a phase change by film boiling of a liquid using an electrothermal conversion element such as heating resistor; a shape-memory-alloy actuator which uses a metal phase change due to a temperature change; and an electrostatic actuator which uses an electrostatic force.

<Pre-Treatment Process>

A method for depositing a pre-treatment liquid to the recording medium in the pre-treatment process is not particularly restricted and may be appropriately selected according to necessity. Examples thereof include a coating method and a method to use the flying (inkjet discharging) unit. Nonetheless, the coating method which applies the pre-treatment liquid uniformly on a surface of printing paper is preferable. Examples of the coating method include a blade coating method, a gravure coating method, a gravure offset coating method, a bar coating method, a roll coating method, a knife coating method, an air knife coating method, a comma coating method, a U comma coating method, an AKKU coating method, a smoothing coating method, a micro-gravure coating, a reverse roll coating method, a four-roll or five-roll coating method, a dip-coating method, a curtain coating method, a slide coating method, and a die coating method.

The pre-treatment process is effective for the recording medium when the process is carried out on a surface thereof which is sufficiently dry or being dried. Here, a drying step may be allocated to dry the pre-treated recording medium according to necessity. For example, the drying step include drying printing paper using an infrared drying apparatus, a microwave drying apparatus, a roll heater or a drum heater, or with hot air.

A wet deposition amount of the pre-treatment liquid on the recording medium is preferably in a range of 0.1 g/m$^2$ to 30.0 g/m$^2$, and more preferably in a range of 0.2 g/m$^2$ to 10.0 g/m$^2$. When the deposition amount is less than 0.1 g/m$^2$, image quality (image density, color saturation, beading and color bleed) hardly improves. When it exceeds 30.0 g/m$^2$, drying properties of the pre-treatment liquid degrades, and further curling may occur.

<Image Forming Process>

The image forming process is a process to form an image on the recording medium by applying a stimulus (energy) to an ink to fly the ink to the recording medium on which a pre-treatment liquid has been coated according to necessity. Various heretofore known methods may be used for this process, examples thereof including an inkjet recording method by head scanning and an inkjet recording method of image recording on a specific sheet using heads in line.

A method for driving a recording head as an ink flying unit in the image forming process is not particularly restricted, and it may be appropriately selected according to necessity. For example, an on-demand head which uses a piezoelectric element actuator using a PZT, a scheme of applying thermal energy or an actuator using an electrostatic force may be used, or a recording may be carried out with a head of a continuously-jetting charge-controlled head.

<Post-Treatment Process>

The post-treatment process is a process of forming a protective layer by depositing the post-treatment liquid including a transparent resin on a surface of an image-forming section formed in the image forming process.

The post-treatment liquid may be deposited on the whole surface of the recording medium, on the whole surface of the image-forming section, or only on a specific area of the image-forming section. A method for depositing the post-treatment liquid is not particularly restricted, and various methods may be appropriately selected depending on types of the post-treatment liquid. Nonetheless, a method similar to the coating method of the pre-treatment liquid or a method similar to the ink flying method is preferable. Among these, in view of apparatus configuration and storage stability of the post-treatment liquid, the method similar to the ink flying method is particularly preferable.

A dry amount of deposition of the post-treatment liquid on the recording medium is preferably 0.5 g/m$^2$ to 10 g/m$^2$, and more preferably 2 g/m$^2$ to 8 g/m$^2$. When the amount of deposition is less than 0.5 g/m$^2$, image quality (image density, color saturation, gloss and fixability) hardly improves. When it exceeds 10 g/m$^2$, drying properties of the protective layer decrease and effects of improving the image quality is saturated, which are economically disadvantageous.

In the image forming method of the present invention, a step for heat drying the recording medium on which the post-treatment liquid has been deposited may be allocated according to necessity. The heat drying may be carried out, for example, by an infrared drying apparatus, a microwave drying apparatus, a roll heater, a drum heater or hot air. Also, for smoothening and image fixing on a surface of the image-forming section, a fixing step may be allocated for heat-fixing by heating to 100° C. to 150° C. by a heat-fixing unit. Thereby, gloss and fixability of a recorded matter improve. The heat-fixing unit is not particularly restricted and may be appropriately selected according to necessity. Nonetheless, a roller and a drum heater having a heated mirror surface are favorably used. A mirror surface portion (smooth portion) of the roll heater and the drum heater may be contacted to a surface of an image-forming section. A heat-fixing temperature is not particularly restricted and may be appropriately selected according to necessity. Nonetheless, it is preferably at a softening point of a thermoplastic resin used for the protective layer or higher. However, in view of image quality, safety and economy, a fixing roller heated to 100° C. to 150° C. is preferable. When it is heated above 150° C., a resin used in the post treatment may degrade.

Examples of the image forming method of the present invention are illustrated in FIG. 1 to FIG. 6.

These are schematic diagrams, each illustrating an overall configuration of the image forming method, where a pre-treatment liquid is deposited on a recording medium in a pre-treatment process, an ink is discharged to form an image in an image forming process, and a post-treatment liquid is deposited on an image-forming section in a post-treatment process, and a drying and fixing processes are further allocated.

Figure 2:
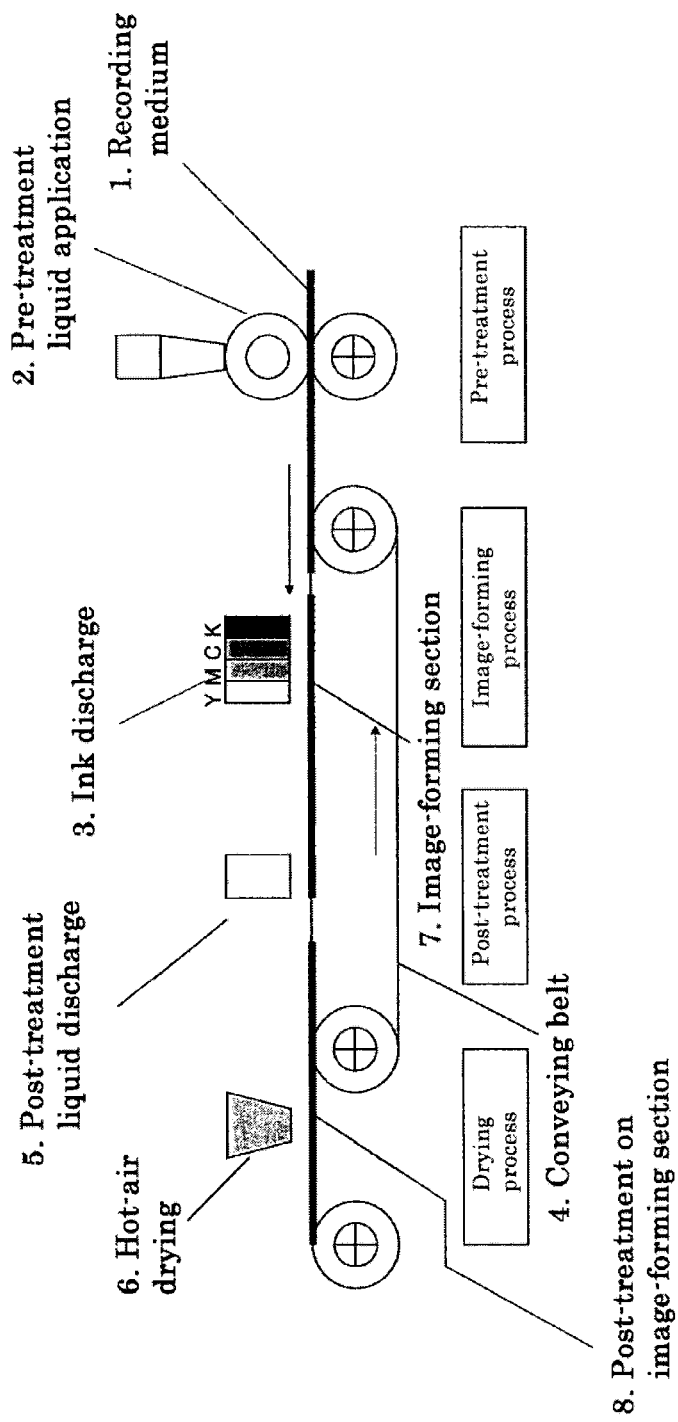
FIG. 2 is a schematic diagram illustrating one example of an overall configuration of an image forming method of the present invention (hot-air drying).
Figure 3:
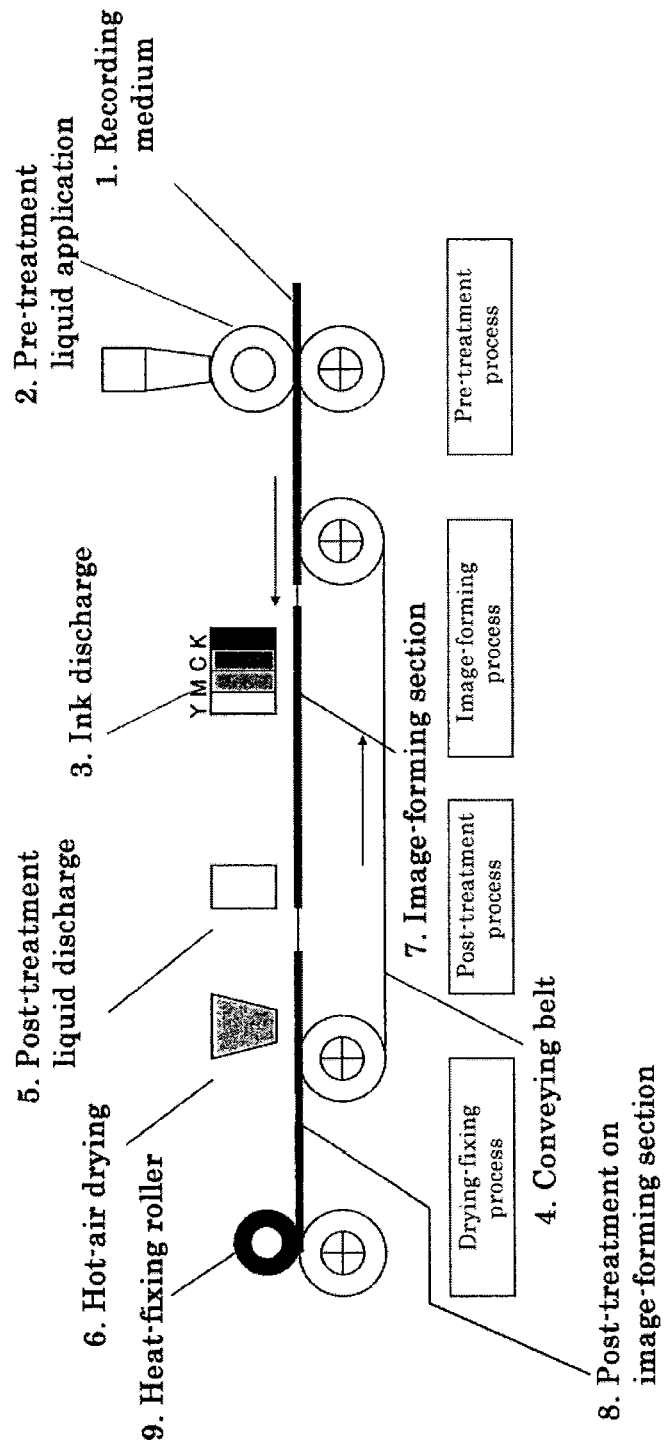
FIG. 3 is a schematic diagram illustrating one example of an overall configuration of an image forming method of the present invention (hot-air drying+heat fixing roller).
Figure 4:
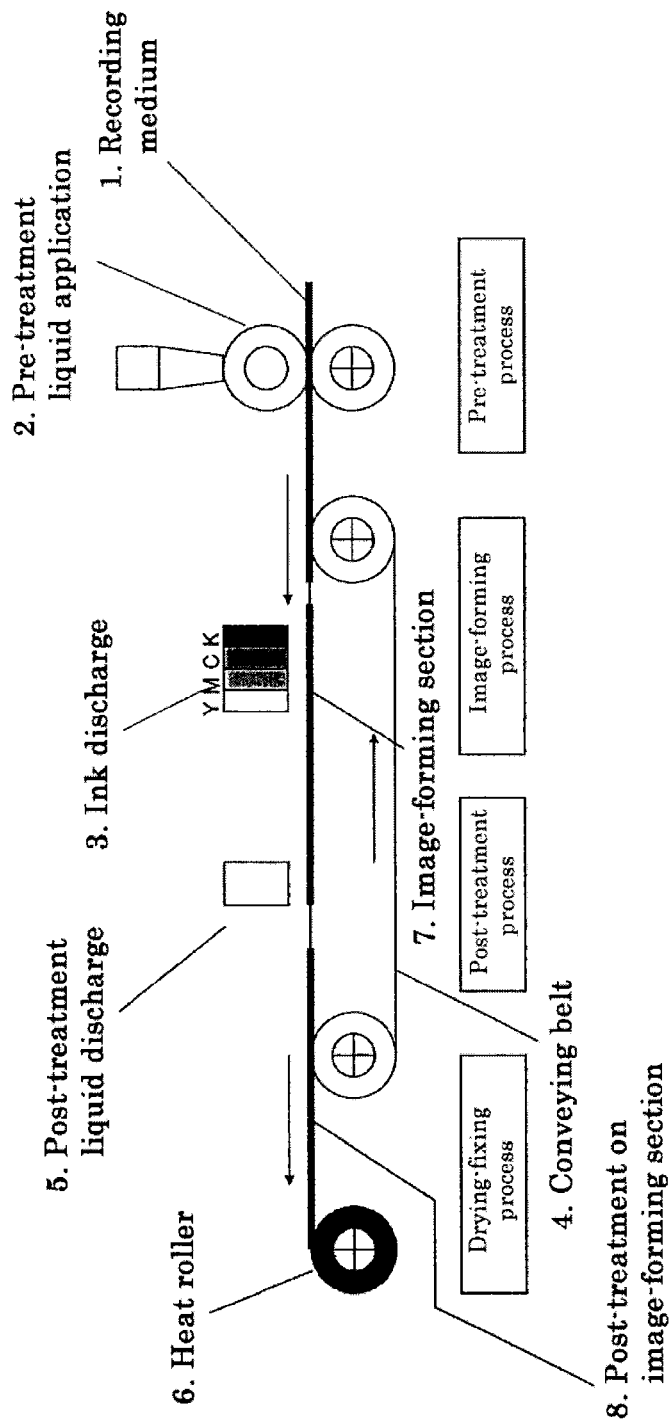
FIG. 4 is a schematic diagram illustrating one example of an overall configuration of an image forming method of the present invention (heat roller drying).
Figure 5:
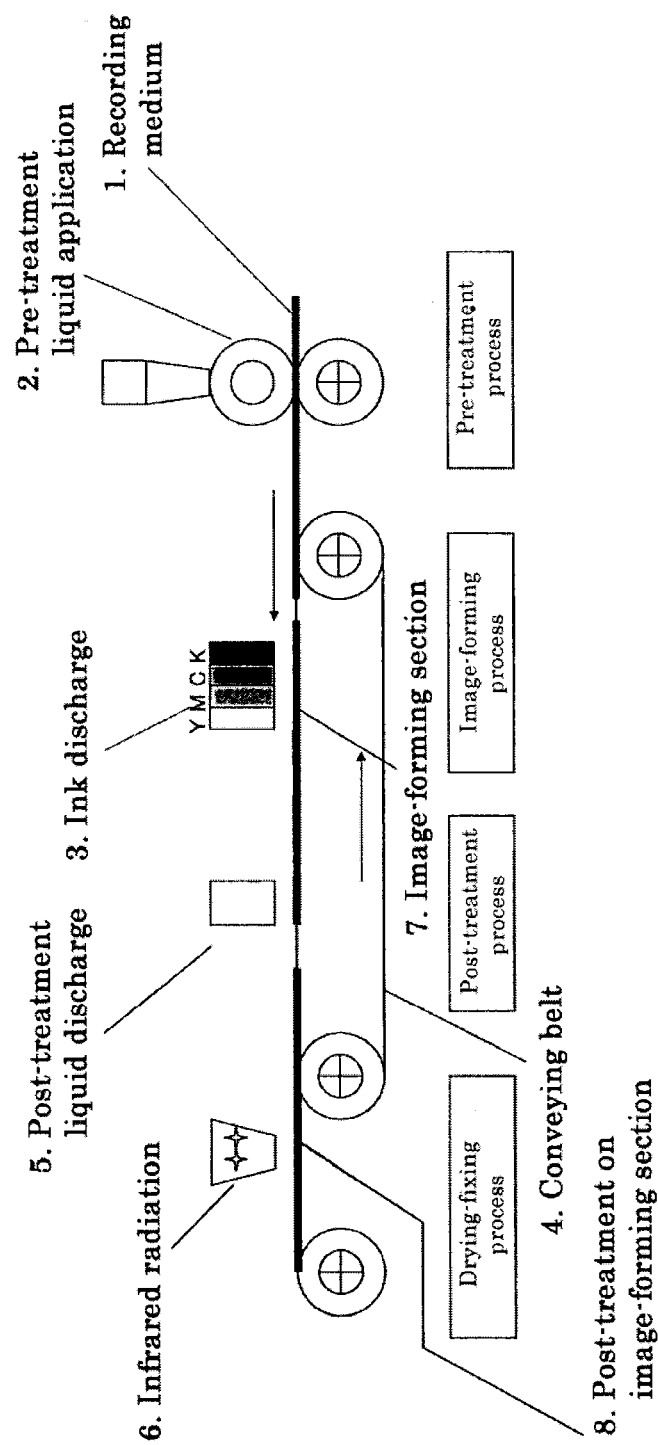
FIG. 5 is a schematic diagram illustrating one example of an overall configuration of an image forming method of the present invention (infrared radiation drying).
Figure 6:
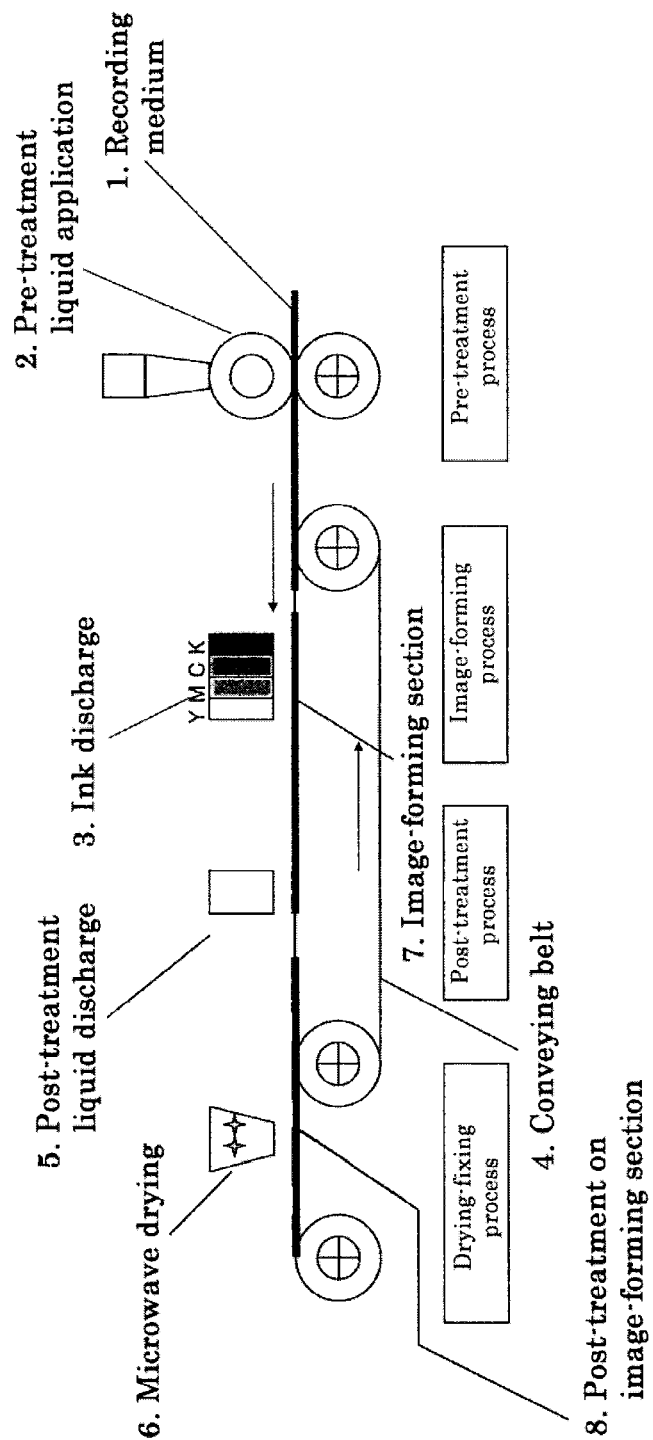
FIG. 6 is a schematic diagram illustrating one example of an overall configuration of an image forming method of the present invention (microwave drying).

Specifically, FIG. 1 illustrates a case of natural drying; FIG. 2 illustrates a case of hot-air drying; FIG. 3 illustrates a case of using a heat fixing roller in addition to hot-air drying; FIG. 4 illustrates a case of heat-roller drying; FIG. 5 illustrates a case of infrared radiation drying; FIG. 6 illustrate cases of microwave drying.

It is preferable to carry out the pre-treatment process continuously at a constant linear speed of 10 mm/s to 5,000 mm/s. Thus, in these examples, using a recording medium of sheet, after completing a step of depositing the pre-treatment liquid on the recording medium, the image forming process is started, and an image is formed by an inkjet recording method. In this method, a speed of depositing the pre-treatment liquid and a speed of recording an image do not coincide in most cases, and thus at a record starting portion and a record ending portion of the recording medium of that sheet, there is a discrepancy in time from the pre-treatment liquid is applied to an image is recorded. Even if this discrepancy widens, moisture evaporation from the liquid is significantly suppressed for the pre-treatment liquid adjusted to have a boiling point higher than water, to have a large amount of an aqueous solvent having a small evaporation speed, and to have a moisture ratio close to an amount in equilibrium with an amount of moisture in the air of an environment in which the printer is used. Accordingly, a difference in the image quality between the record starting portion and the record ending portion on the recording medium of sheet may be reduced to below a level which may be visually observed.

As in the cases of the methods of FIG. 1 to FIG. 6, after depositing the pre-treatment liquid, in order to form an image, it is generally necessary to convey the recording medium on which the pre-treatment liquid has been deposited is conveyed by a unit which contacts the recording medium such as roller and guide. In such a case, if the pre-treatment liquid deposited on the recording medium is transferred to a conveying member of the recording medium, conveying function is impaired or contamination accumulates, which may result in decreased image quality. To prevent this problem, measures such as using a corrugated plate as the guide, forming the roller in a spur shape or using a water-shedding material for a surface of the roller may be taken to the apparatus, and occurrences of the problem may be reduced.

However, it is desirable that the pre-treatment liquid deposited on the recording medium is absorbed by the recording medium as quickly as possible so that the recording medium is apparently dried. To achieve this objective, it is effective to have a static surface tension of the pre-treatment liquid to 30 mN/m or less so that the liquid quickly penetrates into the recording medium. "Drying and solidifying" after deposition of the pre-treatment liquid does not mean that the pre-treatment liquid is absorbed by the recording medium and looks apparently dried as described above but means that the pre-treatment liquid cannot maintain a liquid state and solidifies because of evaporation of liquid compounds such as moisture. Thus, by selecting a favorable pre-treatment liquid and by using an image forming apparatus as a combination of a pre-treatment liquid applying apparatus and an image recording apparatus, the pre-treatment liquid is absorbed by the recording medium, and inkjet recording may be carried out with the pre-treatment liquid not solidified even though it is apparently dried. Accordingly, image quality may be significantly improved even with an extremely small deposition amount of the pre-treatment liquid.

(Cartridge)

A cartridge of the present invention includes the post-treatment liquid for inkjet recording of the present invention contained in a container, and it further includes other members appropriately selected according to necessity.

The container is not particularly restricted, and its shape, structure, composition, and materials may be appropriately selected according to purpose. Examples thereof include a plastic container and those including a bag formed of an aluminum laminate film or a resin film.

Specific examples thereof include a treatment liquid cartridge illustrated in FIG. 9 and FIG. 10 described hereinafter.

(Image Forming Apparatus)

An image forming apparatus of the present invention is an apparatus equipped with a cartridge of the present invention, in addition to various units relating to image formation, and it further includes other units according to necessity.

As an example, the image forming apparatus of the present invention includes: an image forming unit which forms an image by an inkjet method on a surface of a recording medium; a storage unit which stores a first treatment liquid (pre-treatment liquid), a storage unit (a cartridge of the present invention) which stores a second treatment liquid (post-treatment liquid), and a storage unit (ink cartridge) which stores an ink; a processing unit which processes the surface of the recording medium before image formation by the image forming unit the first treatment liquid; and a processing unit which processes with the treatment liquid after the image formation by the image forming unit, and it further includes other units appropriately selected according to necessity. The image forming unit includes at least an ink flying unit, and it further includes other units such as stimulus generating unit and controlling unit according to necessity.

Figure 7:
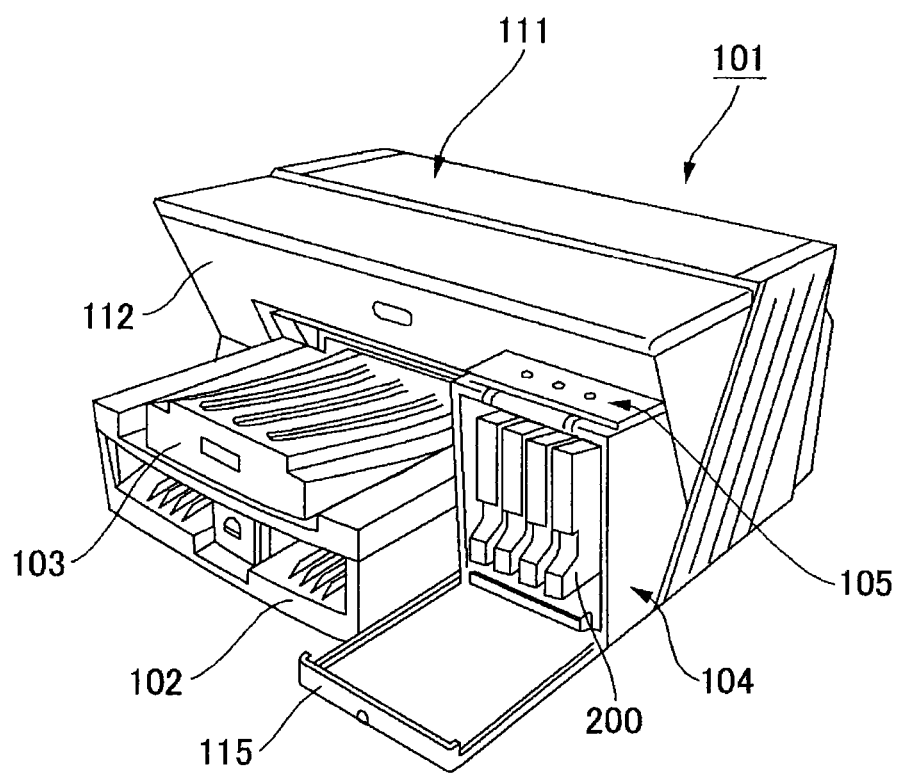
FIG. 7 is a perspective view illustrating an ink cartridge loading section of an inkjet recording apparatus (image forming apparatus) with its cover open.
Figure 8:
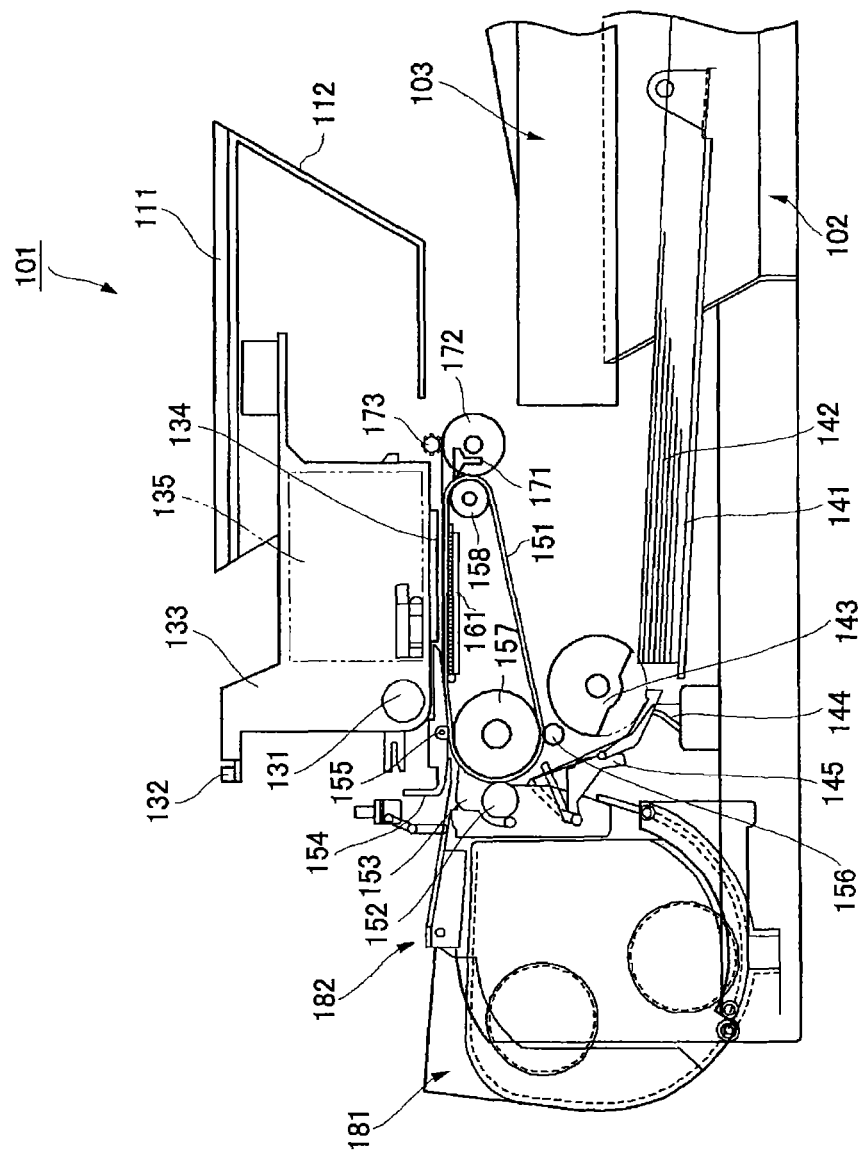
FIG. 8 is a schematic configuration diagram explaining an overall configuration of an inkjet recording apparatus.

FIG. 7 and FIG. 8 are schematic diagrams (explanatory diagrams) illustrating one example of the image forming apparatus of the present invention.

The image forming apparatus illustrated in FIG. 7 (hereinafter also referred to as an inkjet recording apparatus) includes: an apparatus body (101); a paper feed tray (102) mounted on the apparatus body (101) for loading sheets; a discharge tray (103) mounted on the apparatus body (101) for storing the sheets on which an image has been recorded (formed); and an ink cartridge loading section (104). On a top surface of the ink cartridge loading section (104), an operation unit (105) including operation keys and indicators is arranged. The ink cartridge loading section (104) includes an openable and closable front cover (115) for attaching and detaching ink cartridges (200). Reference numerals (111) and (112) denote a top cover and a front side of a front cover, respectively. A post-treatment liquid may be discharged if a cartridge containing the post-treatment liquid is mounted in place of these ink cartridges (200) or in addition thereto.

In the apparatus body (101), as illustrated in FIG. 8, a carriage (133) is held slidably by a guide rod (131) and a stay (132) as guiding members stretched horizontally by left and right side plates (not shown) in a main scanning direction, and moving scan is carried out by a main scanning motor (not shown).

In the carriage (133), a plurality of ink discharge openings of a recording head (134) composed of four (4) inkjet recording heads which discharge ink drops of respective colors, namely yellow (Y), cyan (C), magenta (M), black (Bk) is arranged in a direction intersecting a main scanning direction and is installed so that ink drop discharge direction is directed downward.

As an inkjet recording head which constitutes the recording head (134), a head equipped with a piezo actuator such as piezoelectric element, a thermal actuator which makes use of a phase change by film boiling of a liquid using an electrothermal conversion element such as heating resistor or a shape-memory-alloy actuator which uses a metal phase change due to a temperature change as an energy generating unit for discharging the inks may be used.

Also, subtanks (135) of respective colors are installed in the carriage (133) for supplying inks of respective colors to the recording head (134). The subtanks (135) are replenished with the inks supplied from the ink cartridges (200) mounted on the ink cartridge loading section (104) via an ink supply tube (not shown).

Meanwhile, as a paper feed unit for feeding sheets (142) loaded on a sheet stacking unit (pressure plate) (141) of the paper feed tray (102), there are a half-moon roller [paper feed roller (143)], which feed one sheet at a time from the sheets (142) in the sheet stacking unit (141), and a separation pad (144) composed of a material having a high frictional coefficient, facing the paper feed roller (143). This separation pad (144) is biased to the paper feed roller (143).

As a conveying unit for conveying the sheet (142) fed from this paper feed unit in a downstream side of the recording head (134), the apparatus includes: a conveying belt (151) for conveying the sheet (142) by electrostatic adsorption; a counter roller (152) for conveying the sheet (142) send from the paper feed unit via a guide (145) by sandwiching between the conveying belt (151); a conveyance guide (153) for having the sheet (142) sent in a substantially vertical and upward direction follow the conveying belt (151) by diverting it approximately by 90°; and a front pressure roller (155) biased to the conveying belt (151) by a pressing member (154), and it also includes a charging roller (156) as a charging unit for charging a surface of the conveying belt (151).

The conveying belt (151) is an endless belt stretched between a conveying roller (157) and a tension roller (158), and it may circulate in a conveying direction of the belt. This conveying belt (151) includes, for example: a surface layer as a sheet adsorbing surface formed of a resin material having a thickness of 40 μm without resistivity control, e.g. a copolymer of tetrafluoroethylene and ethylene (ETFE); and a back layer (a medium resistance layer, a grounded layer) made of this surface layer but with resistivity control with carbon. Behind the conveying belt (151), a guiding member (161) is arranged, corresponding to an imaging region by the recording head (134). Here, as a paper discharge unit for discharging the sheet (142) on which recording has been carried out with the recording head (134), there are a separation claw (171) for separating the sheet (142) from the conveying belt (151), a discharge roller (172) and a discharge roller (173), and the discharge tray (103) is arranged in a downstream of the discharge roller (172).

On a back of the apparatus body (101), a two-side paper feed unit (181) is detachably mounted. The two-side paper feed unit (181) captures and inverts the sheet (142) returned by the conveying belt (151) rotating in a reverse direction to feed it again between the counter roller (152) and the conveying belt (151). Here, on a top surface of the two-side paper feed unit (181), a manual sheet-feeding unit (182) is disposed.

In this inkjet recording apparatus, the sheet (142) is separated one by one and fed from paper feed unit, and the sheet (142) fed in a substantially vertical and upward direction is guided by the guide (145) and conveyed while sandwiched between the conveying belt (151) and the counter roller (152). Further, a tip thereof is guided by the conveyance guide (153) and pressed against the conveying belt (151) by the front pressure roller (155), and its conveying direction is diverted approximately by 90°.

At this time, the conveying belt (157) is charged by the charging roller (156), and the sheet (142) is electrostatically adsorbed and conveyed by the conveying belt (151). Here, by driving the recording head (134) by moving the carriage (133) in accordance with an image signal, ink drops are discharged to the sheet (142) being stopped to record one line. After the sheet (142) is conveyed by a predetermined amount, recording of a next line is carried out. By receiving a recording end signal or a signal that a rear end of the sheet (142) has reached the recording area, the recording operation is terminated, and the sheet (142) is discharged in the discharge tray (103).

Then, the ink remaining in the subtank (135) is detected to be nearly empty, a required amount of the ink is supplied from the ink cartridge (200) to the subtank (135).

In this inkjet recording apparatus, when the ink in the ink cartridge (200) is run out, it is possible to replace only the ink bag inside by decomposing a housing of the ink cartridge (200). Also, the ink cartridge (200) may supply the ink in a stable manner even when it is arranged vertically in a front-loading configuration. Thus, in a case where a top of the apparatus body (101) is blocked, e.g. the apparatus is arranged in a rack or an object is placed on a top surface of the apparatus body (101), the ink cartridge (200) may be easily exchanged.

Here, the example of a serial-type (shuttle-type) inkjet recording apparatus in which a carriage scans is explained above, but it is similarly applied to a line-type inkjet recording apparatus equipped with a line-type head.

Also, although it is not shown, in a case where a pre-treatment liquid or a post-treatment liquid is roller coated, a drive control of rollers for coating such as coating roller is required. Thus, a motor control unit for coating, a motor to be controlled and a controlling sensor are arranged.

Further, when pre-treatment liquid or a post-treatment liquid is discharged by inkjet, there is a risk of nozzle clogging caused by color mixture unless a maintenance operation is carried out separately from the other inks Thus, it is desirable that a maintenance unit moving motor is arranged for each treatment liquid separately from those for the inks.

Next, the cartridge which contains the pre-treatment liquid or the post-treatment liquid (hereinafter referred to as a treatment liquid) is explained in reference to FIG. 9 and FIG. 10. Here, FIG. 9 is a diagram illustrating one example of the cartridge of the present invention, and FIG. 10 is a diagram including a case (exterior) of the cartridge of FIG. 9.

Figure 9:
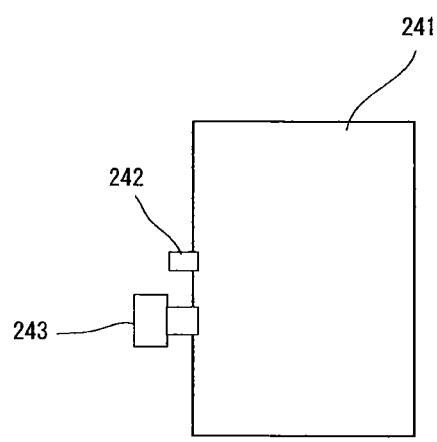
FIG. 9 is a schematic diagram illustrating a post-treatment liquid bag as one example of a cartridge of the present invention.
Figure 10:
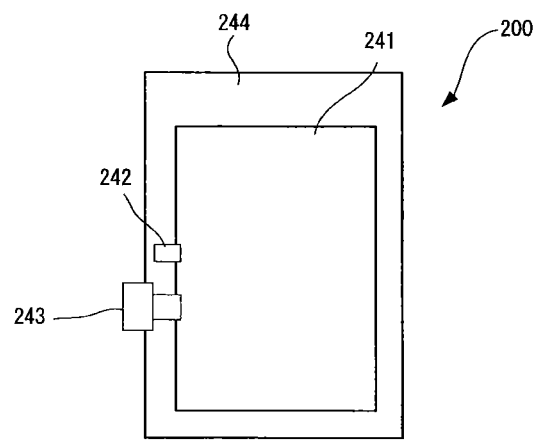
FIG. 10 is a schematic diagram illustrating a cartridge that the post-treatment liquid bag of FIG. 9 is further contained in a cartridge case.

As illustrated in FIG. 9, a treatment liquid is filled in a treatment liquid bag 241 from a treatment liquid inlet 242, and air remaining in the treatment liquid bag is evacuated. Then, the treatment liquid inlet 242 is sealed. When in use, the treatment liquid is supplied to the apparatus by inserting a needle of the apparatus body in a treatment liquid outlet 243 made of a rubber material. The treatment liquid bag 241 is formed of a packaging material having no air permeability such as aluminum laminate film. Also, as illustrated in FIG. 10, it is usually contained in a cartridge case 244 made of plastics and used as a cartridge 200 by being detachably mounted on various image forming apparatuses.

Also, if the cartridge 240 is used as an ink cartridge by filling it with an ink instead of the treatment liquid, similarly to the cartridge of the treatment liquid, it may be used by detachably mounting it on various image forming apparatuses.

Further, the ink, the pre-treatment liquid and the post-treatment liquid may be stored together in a large-capacity cartridge (e.g. rectenna).

EXAMPLES

Hereinafter, the present invention is explained in further detail with reference to examples and comparative examples, but the present invention is not to be construed by these examples.

Production Example 1

A homogeneous mixture was prepared by mixing and stirring materials of a formulation shown below as Post-treatment liquid for inkjet recording 1 for 1 hour. Next, it was subjected to a pressure filtration by a polyvinylidene fluoride membrane filter having an average pore diameter of 5.0 μm to remove coarse particles and dust, and a post-treatment liquid for inkjet recording of Production Example 1 was obtained.
[Post-Treatment Liquid for Inkjet Recording 1]

| | |
|---|---|
| Anionic self-emulsifying ether-based urethane resin WLS-210 (manufactured by DIC Corporation; active ingredient: 35% by mass) | 28.6% by mass |
| 1,3-Butanediol | 15% by mass |
| Glycerin | 15% by mass |
| ZONYL FS-300 (fluorosurfactant, manufactured by DuPont Co.; ingredient: 40% by mass) | 1% by mass |
| Pure water | 40.4% by mass |

<Pre-Treatment Liquid>

Uniform mixtures were prepared by respectively mixing and stirring materials of formulations shown below as Pre-treatment liquids 1 and 2 for 1 hour. Next, they were subjected to polyvinylidene fluoride membrane filter having an average pore diameter of 5.0 μm to remove coarse particles and dust, and pre-treatment liquids were respectively obtained.
[Pre-Treatment Liquid 1]

| | |
|---|---|
| Lactic acid | 10% by mass |
| 1,3-Butanediol | 10% by mass |
| Glycerin | 10% by mass |
| 2-Ethyl-1,3-hexanediol | 1% by mass |
| Pure water | 69% by mass |

[Pre-Treatment Liquid 2]

| | |
|---|---|
| Magnesium sulfate | 10% by mass |
| 1,3-Butanediol | 10% by mass |
| Glycerin | 10% by mass |
| 2-Ethyl-1,3-hexanediol | 1% by mass |
| Pure water | 69% by mass |

<Preparation of Pigment-Containing Polymeric Particle Dispersion>
—Preparation of Polymer Solution A—

After a 1-liter flask equipped with a mechanical stirrer, a thermometer, a nitrogen gas inlet tube, a reflux tube and a dropping funnel was sufficiently purged with a nitrogen gas, 11.2 g of styrene, 2.8 g of acrylic acid, 12.0 g of lauryl methacrylate, 4.0 g of polyethylene glycol methacrylate, 4.0 g of a styrene macromer, and 0.4 g of mercaptoethanol were mixed and heated to 65° C.

Next, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of a styrene macromer, 3.6 g of mercaptoethanol, 2.4 g of azobismethylvaleronitrile, and 18.0 g of methyl ethyl ketone was added dropwise in the flask over 2.5 hours. After the dropwise addition, a mixed solution of 0.8 g of azobismethylvaleronitrile and 18 g of methyl ethyl ketone was added dropwise in the flask over 0.5 hours. After it was aged at 65° C. for 1 hour, 0.8 g of azobismethylvaleronitrile was added, and it was further aged for 1 hour. After completion of the reaction, 364.0 g of methyl ethyl ketone was added in the flask, and 800 g of Polymer Solution A having a concentration of 50% by mass was obtained.

Preparation of Magenta Pigment-Containing Polymeric Particle Dispersion

Preparation Example a

After sufficient stirring of 28 g of Polymer Solution A, 42 g of C.I. Pigment Red 122, 13.6 g of a 1-mol/L aqueous solution of potassium hydroxide, 20.0 g of methyl ethyl ketone, and 13.6 g of ion-exchanged water, the mixture was kneaded using a roll mill.

After an obtained paste was sufficiently stirred with an addition of 200 g of pure water, methyl ethyl ketone and water were distilled using an evaporator, and it was further subjected to a pressure filtration by a polyvinylidene fluoride membrane filter having an average pore diameter of 5.0 μm in order to remove coarse particles. Thereby, a magenta pigment-containing polymeric particle dispersion having a pigment content of 15% by mass and a solid content of 20% by mass was obtained.

An average particle diameter (D50) of the polymeric particles in this dispersion was measured, and it was 82.7 nm. Here, the measurement of an average particle diameter (D50) was carried out using a particle size distribution measuring apparatus (NANOTRAC UPA-EX150, manufactured by Nikkiso Co., Ltd.).

Preparation of Cyan Pigment-Containing Polymeric Particle Dispersion

Preparation Example b

A cyan pigment-containing polymeric particle dispersion having a pigment content of 15% by mass and a solid content of 20% by mass was obtained in the same manner as Preparation Example a except that C.I. Pigment Red 122 in Preparation Example a was changed to a phthalocyanine pigment (C.I. Pigment Blue 15:3).

An average particle diameter (D50) of the polymeric particles in this dispersion was measured similarly to Preparation Example a, and it was 110.6 nm.

Preparation of Yellow Pigment-Containing Polymeric Particle Dispersion

Preparation Example c

A yellow pigment-containing polymeric particle dispersion having a pigment content of 15% by mass and a solid content of 20% by mass was obtained in the same manner as Preparation Example a except that C.I. Pigment Red 122 in Preparation Example a was changed to a monoazo yellow pigment (C.I. Pigment Yellow 74).

An average particle diameter (D50) of the polymeric particles in this dispersion was measured similarly to Preparation Example a, and it was 105.4 nm.

Preparation of Carbon Black Pigment-Containing Polymeric Particle Dispersion

Preparation Example d a carbon black pigment-containing polymeric particle dispersion having a pigment content of 15% by mass and a solid content of 20% by mass was obtained in the same manner as Preparation Example a except that C.I. Pigment Red 122 in Preparation Example a was changed to a carbon black (FW100, manufactured by Degussa).

An average particle diameter (D50) of the polymeric particles in this dispersion was measured similarly to Preparation Example a, and it was 75.2 nm.

Preparation Examples 1 to 8 of Water-Based Inks for Inkjet Recording

A homogeneous mixed solution was prepared by mixing and stirring a water-soluble organic solvent, a penetrating agent, a surfactant, a fungicide, water and a water-dispersible resin depending on Preparation Examples shown in respective columns of Preparation Example in Table 1-1 and Table 1-2 below for 1 hour. Next, a pigment dispersion, a defoamer and a pH adjuster were added, which was mixed and stirred for 1 hour, and a dispersion was obtained. This dispersion was subjected to pressure filtration by a polyvinylidene fluoride membrane filter having an average pore diameter of 5.0 μm to remove coarse particles and dust, and water-based inks for inkjet recording of Preparation Examples 1 to 8 were obtained, respectively.

TABLE 1-1

| | | Ink Preparation Example | | | |
|---|---|---|---|---|---|
| Component (% by mass) | | 1 | 2 | 3 | 4 |
| Pigment dispersion | Magenta pigment-containing polymer particle dispersion (Preparation Example a) | 53.3 | | | |
| | Cyan pigment-containing polymer particle dispersion (Preparation Example b) | | 33.3 | | |
| | Yellow pigment-containing polymer particle dispersion (Preparation Example c) | | | 33.3 | |
| | Black pigment-containing polymer particle dispersion (Preparation Example d) | | | | 53.3 |
| | Magenta pigment self-dispersion CAB-O-JET260 | | | | |
| | Cyan pigment self-dispersion CAB-O-JET250 | | | | |
| | Yellow pigment self-dispersion CAB-O-JET270 | | | | |
| | Black pigment self-dispersion CAB-O-JET300 | | | | |
| Water-dispersible resin | Fluorine resin emulsion | | | | |
| Water-soluble aqueous solvent (wetting agent) | 1,3-Butanediol | 21.8 | 26.0 | 26.0 | |
| | 3-Methyl-1,3-butanediol | | | | 16.0 |
| | 2-Pyrrolidone | | | | |
| | Glycerin | 14.5 | 13.0 | 13.0 | 16.0 |
| Penetrating agent | 2-Ethyl-1,3-hexanediol | 1.0 | 1.0 | 1.0 | 1.0 |
| | 2,2,4-Trimethyl-1,3-pentanediol | 1.0 | 1.0 | 1.0 | 1.0 |
| Surfactant | ZONYL FS-300 | 2.5 | 2.5 | 2.5 | 2.5 |
| | KF-640 | | | | |
| Fungicide | Proxel GXL | 0.05 | 0.05 | 0.05 | 0.05 |
| Defoamer | Silicone defoamer KM-72F | 0.1 | 0.1 | 0.1 | 0.1 |
| pH adjuster | 2-Amino-2-ethyl-1,3-propanediol | 0.2 | 0.4 | 0.3 | 0.2 |
| Pure water | | 5.55 | 22.65 | 22.75 | 9.85 |
| Total (% by mass) | | 100 | 100 | 100 | 100 |

TABLE 1-2

| | | Ink Preparation Example | | | |
|---|---|---|---|---|---|
| Component (% by mass) | | 5 | 6 | 7 | 8 |
| Pigment dispersion | Magenta pigment-containing polymer particle dispersion (Preparation Example a) | | | | |
| | Cyan pigment-containing polymer particle dispersion (Preparation Example b) | | | | |
| | Yellow pigment-containing polymer particle dispersion (Preparation Example c) | | | | |
| | Black pigment-containing polymer particle dispersion (Preparation Example d) | | | | |
| | Magenta pigment self-dispersion CAB-O-JET260 | 59.1 | | | |
| | Cyan pigment self-dispersion CAB-O-JET250 | | 45.5 | | |
| | Yellow pigment self-dispersion CAB-O-JET270 | | | 45.5 | |
| | Black pigment self-dispersion CAB-O-JET300 | | | | 53.3 |
| Water-dispersible resin | Fluorine resin emulsion | 5.8 | 7.7 | 7.7 | 5.8 |
| Water-soluble aqueous solvent (wetting agent) | 1,3-Butanediol | 15.0 | 17.0 | 27.0 | |
| | 3-Methyl-1,3-butanediol | | | | 16.0 |
| | 2-Pyrrolidone | | | | 2.0 |
| | Glycerin | 10.0 | 17.0 | 9.0 | 16.0 |
| Penetrating agent | 2-Ethyl-1,3-hexanediol | 2.0 | 2.0 | 2.0 | 2.0 |
| | 2,2,4-Trimethyl-1,3-pentanediol | | | | |
| Surfactant | ZONYL FS-300 | | | | |
| | KF-640 | 1.0 | 1.0 | 1.0 | 1.0 |
| Fungicide | Proxel GXL | 0.05 | 0.05 | 0.05 | 0.05 |
| Defoamer | Silicone defoamer KM-72F | 0.1 | 0.1 | 0.1 | 0.1 |
| pH adjuster | 2-Amino-2-ethyl-1,3-propanediol | 0.3 | 0.3 | 0.3 | 0.6 |
| Pure water | | 6.65 | 9.35 | 7.35 | 3.15 |
| Total (% by mass) | | 100 | 100 | 100 | 100 |

Meanings of abbreviations, etc. in Table 1-1 and Table 1-2 are the following.

CAB-O-JET260: a self-dispersible magenta pigment dispersion manufactured by Cabot, Inc. having a pigment solid content of 11%

CAB-O-JET250; a self-dispersible cyan pigment dispersion manufactured by Cabot, Inc. having a pigment solid content of 11%

CAB-O-JET270; a self-dispersible yellow pigment dispersion manufactured by Cabot, Inc. having a pigment solid content of 11%

CAB-O-JET300: a self-dispersible black pigment dispersion manufactured by Cabot, Inc. having a pigment solid content of 15%

Fluorine resin emulsion: LUMIFLON FE4500 manufactured by Asahi Glass Co., Ltd. having a solid content of 52% by mass, an average particle diameter of 136 nm and a minimum film-forming temperature (MFT)=28° C.

KF-640: a polyether-modified silicone surfactant (manufactured by Shin-Etsu Chemical Co., Ltd.; ingredient: 100% by mass)

Proxel GXL: a fungicide having 1,2-benzisothiazolin-3-one as a main component (manufactured by Avecia Biotechnology Inc.; ingredient: 20% by mass; including dipropylene glycol)

KM-72F: a self-emulsifying silicone defoamer (manufactured by Shin-Etsu Chemical Co., Ltd.; ingredient: 100% by mass)

Examples 1-1 to 2-4, Comparative Examples 1-1 to 2-4

Using the pre-treatment liquids, the inks, and the post-treatment liquid in combination as shown in the columns of Examples 1-1 to 2-4 of Table 2 and the columns of Comparative Example 1-1 to 2-4 of Table 3, an image was formed on offset printing paper (OK Top Coat, manufactured by Oji Paper Co., Ltd.: Grade A2) with an inkjet printer IPSIO GXE-5500 manufactured by Ricoh Company, Ltd., and then the post-treatment liquid was discharged on an image-forming section. The printing was carried out by one-pass printing at a resolution of 1,200 dpi. In Examples and Comparative Examples, a recording medium treated with the pre-treatment liquid was used.

The images formed in the respective Examples and Comparative Examples were respectively evaluated for their image scratch resistance (smear fixability) and beading as follows. The results are summarized and shown in Table 2 and Table 3.

<Smear Fixability>

A formed image was a chart including a 64-point character "black square" created with Microsoft Word 2000, and the post-treatment liquid was discharged on the image-forming section.

Next, the formed image was dried at a temperature of 23±2° C. and a humidity of 50±15% RH for 24 hours, and the "black square" portion on the print surface was rubbed back and forth 10 times with JIS L0803 Cotton No. 3 attached to a CM-1 clock meter with a double-sided tape. Thereafter, a reflection density of the ink adhered to the cotton was measured with X-Rite 939 (manufactured by X-Rite, Inc.), and by subtracting a color texture of the cotton, the reflection density of the smear portion was determined according to the following evaluation criteria. Here, "black square" is a character of a solid black square (code), and it is expressed unavoidably as "black square" since it cannot be used in this document.

[Evaluation Criteria]
A: less than 0.07
B: 0.07 or greater, less than 0.1
C: 0.1 or greater <Beading>

The pre-treatment process was carried out on sheets, and then cyan, magenta and green solid images were printed, followed by hot-air drying. Then, the solid images were observed for uneven density (beading) and evaluated according to the following evaluation criteria.

[Evaluation Criteria]
A: none
B: slight
C: present

TABLE 2

| | Example No. | | | | | | | |
|---|---|---|---|---|---|---|---|---|
| | 1-1 | 1-2 | 1-3 | 1-4 | 2-1 | 2-2 | 2-3 | 2-4 |
| Ink No. | 1 | 2 | 3 | 4 | 5 | 6 | 7 | 8 |
| Pre-treatment liquid No. | 1 | 1 | 1 | 1 | 2 | 2 | 2 | 2 |
| Post-treatment | Yes | Yes | Yes | Yes | Yes | Yes | Yes | Yes |
| Beading | B | B | B | B | A | A | A | A |
| Smear fixability | B | B | B | B | A | A | A | A |

TABLE 3

| | Comparative Example No. | | | | | | | |
|---|---|---|---|---|---|---|---|---|
| | 1-1 | 1-2 | 1-3 | 1-4 | 2-1 | 2-2 | 2-3 | 2-4 |
| Ink No. | 1 | 2 | 3 | 4 | 5 | 6 | 7 | 8 |
| Pre-treatment liquid No. | 1 | 1 | 1 | 1 | 2 | 2 | 2 | 2 |
| Post-treatment | No | No | No | No | No | No | No | No |
| Beading | C | C | C | C | C | C | C | C |
| Smear fixability | C | C | C | C | C | C | C | C |

As it may be understood from examples 1-1 to 2-4 and comparative examples 1-1 to 2-4, in an image forming method by inkjet recording, it is possible to obtain an image having superior beading quality and smear fixability (scratch resistance) may be obtained by using a post-treatment liquid including a urethane resin, a fluorosurfactant, a water-soluble organic solvent and water in a post-processing of an image-forming section.

Aspects of the present invention are the following.

<1> A post-treatment liquid for inkjet recording, including a urethane resin, a fluorosurfactant, a water-soluble organic solvent and water.

<2> The post-treatment liquid for inkjet recording according to <1>, wherein the urethane resin is an anionic self-emulsifying ether-based urethane resin.

<3> An image forming method by inkjet recording, including:
an image forming process, wherein an image is formed on a recording medium using an ink; and
a post-treatment process, wherein the post-treatment liquid for inkjet recording according to any one of <1> to <2> is discharged to cover an image-forming section formed in the image forming process, and the image-forming section comprises the image.

<4> The image forming method according to <3>, wherein the ink is a water-based ink, and the recording medium is offset printing paper.

<5> The image forming method according to any one of <3> to <4>,
wherein the image forming method includes a pre-treatment process before the image forming process, and
wherein, in the pre-treatment process, the recording medium is treated with a pre-treatment liquid, including:
a water-soluble organic solvent,
water, and
an aliphatic organic acid salt or an inorganic metal salt, or both thereof.

<6> A cartridge, including the post-treatment liquid for inkjet recording according to any one of <1> to <2>.

<7> An image forming apparatus, including the cartridge according to <6> loaded thereon.

This application claims priority to Japanese application No. 2012-020660, filed on Feb. 2, 2012 and incorporated herein by reference.

What is claimed is:

1. An image forming method by inkjet recording, comprising:
forming an image on a recording medium using an ink; and
post-treating an image-forming section formed in the forming an image by discharging a post-treatment liquid for inkjet recording to coat the image-forming section,
wherein the image-forming section comprises the image, and
wherein the post-treatment liquid for inkjet recording comprises:
an anionic self-emulsifying ether-based urethane resin;
a fluorosurfactant;
a water-soluble organic solvent; and
water.

2. The image forming method according to claim 1, wherein the ink is a water-based ink, and the recording medium is offset printing paper.

3. The image forming method according to claim 1, further comprising pre-treating before the forming an image,
wherein the recording medium is treated with a pre-treatment liquid in the pre-treating, and
wherein the pre-treatment liquid comprises:
a water-soluble organic solvent;
water; and
an aliphatic organic acid salt or an inorganic metal salt, or both thereof.

* * * * *